United States Patent
Steffanson et al.

(10) Patent No.: US 11,933,722 B2
(45) Date of Patent: Mar. 19, 2024

(54) MICRO MIRROR ARRAYS FOR MEASURING ELECTROMAGNETIC RADIATION

(71) Applicant: Calumino Pty Ltd., Eveleigh (AU)

(72) Inventors: Marek Steffanson, Mosman (AU); Gabrielle de Wit, Pymble (AU)

(73) Assignee: Calumino Pty Ltd., Eveleigh (AU)

( * ) Notice: Subject to any disclaimer, the term of this patent is extended or adjusted under 35 U.S.C. 154(b) by 127 days.

(21) Appl. No.: 17/740,088

(22) Filed: May 9, 2022

(65) Prior Publication Data
US 2023/0358672 A1  Nov. 9, 2023

(51) Int. Cl.
*G01N 21/35* (2014.01)
(52) U.S. Cl.
CPC ..... *G01N 21/35* (2013.01); *G01N 2201/0636* (2013.01)
(58) Field of Classification Search
None
See application file for complete search history.

(56) References Cited

U.S. PATENT DOCUMENTS

| | | | | |
|---|---|---|---|---|
| 7,705,307 | B1 * | 4/2010 | Zhao | G01J 5/0831 |
| | | | | 250/338.1 |
| 2015/0377711 | A1 * | 12/2015 | Steffanson | G01J 5/40 |
| | | | | 250/349 |
| 2016/0225477 | A1 * | 8/2016 | Banine | G21K 1/067 |
| 2018/0073931 | A1 * | 3/2018 | Steffanson | G01J 5/0225 |
| 2018/0100768 | A1 * | 4/2018 | Steffanson | G01J 5/0806 |
| 2019/0186999 | A1 * | 6/2019 | Steffanson | G01J 5/10 |

* cited by examiner

*Primary Examiner* — Marcus H Taningco
(74) *Attorney, Agent, or Firm* — Greenberg Traurig

(57) ABSTRACT

A radiation imaging apparatus includes an imaging surface; a light source; and an array of micro mirrors that rotate via radiation absorbed in the micro mirrors and reflect light from the light source to generate a distribution of reflected light on the imaging surface. The array first micro mirrors and second micro mirrors. The first micro mirrors have a first structure and the second micro mirrors have a second structure different than the first structure. The second structure is configured to correct for one or more environmental influences on the radiation imaging apparatus. A photodetector captures an image of the distribution of reflected light on the imaging surface. A processor is coupled to the photodetector. A communication interface is coupled with the processor; and a computing device is located separately from the radiation imaging apparatus and in communication with the communication interface.

20 Claims, 16 Drawing Sheets

MICRO MIRROR ARRAYS FOR MEASURING ELECTROMAGNETIC RADIATION

FIELD OF THE TECHNOLOGY

At least some embodiments disclosed herein relate to electromagnetic radiation detection in general and more particularly but not limited to the sensing of infrared IR radiation.

BACKGROUND

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation. The entire disclosure of U.S. Pat. No. 5,929,440 is hereby incorporated herein by reference.

BRIEF DESCRIPTION OF THE DRAWINGS

The embodiments are illustrated by way of example and not limitation in the figures of the accompanying drawings in which like references indicate similar elements.

Like reference numbers represent the same or similar parts throughout.

DETAILED DESCRIPTION

Figure 1A:
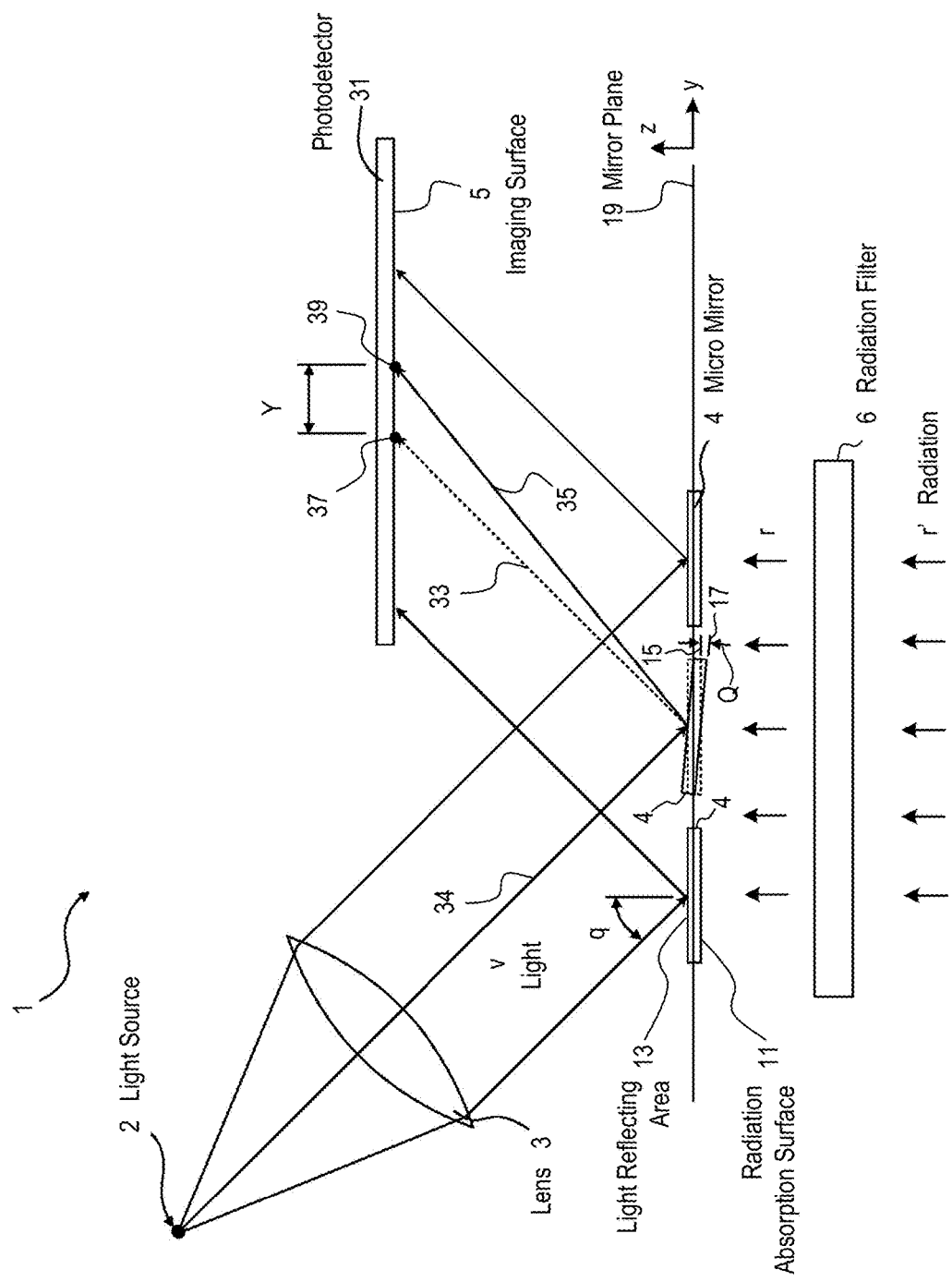
FIG. 1A illustrates an apparatus configured to measure a distribution of electromagnetic radiation according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and such references mean at least one.

The use of headings herein is merely provided for ease of reference, and shall not be interpreted in any way to limit this disclosure or the following claims.

In some aspects, the techniques described herein relate to a system, including: a radiation imaging apparatus, having: an imaging surface; a light source; an array of micro mirrors, wherein the micro mirrors rotate according to radiation absorbed in the micro mirrors and reflect light from the light source to generate a distribution of reflected light on the imaging surface; wherein the array of micro mirrors includes a plurality of first micro mirrors and a plurality of second micro mirrors, wherein the plurality of first micro mirrors include a first structure and the plurality of second micro mirrors include a second structure, the second structure being different than the first structure, wherein the second structure is configured to correct for one or more environmental influences on the radiation imaging apparatus; a photodetector, wherein the photodetector captures an image of the distribution of reflected light on the imaging surface; a processor coupled to the photodetector; and a communication interface coupled with the processor; and a computing device located separately from the radiation imaging apparatus and in communication with the communication interface.

In some aspects, the techniques described herein relate to a system, wherein more of the plurality of first micro mirrors are present in the array of micro mirrors than the plurality of second micro mirrors.

In some aspects, the techniques described herein relate to a system, wherein the plurality of first micro mirrors each include a radiation absorption surface, a light reflecting area, a bi-material actuator, and a self-leveler.

In some aspects, the techniques described herein relate to a system, wherein at least one of the plurality of second micro mirrors includes a light reflecting area, and a member rigidly attaching the at least one of the plurality of second micro mirrors to a frame.

In some aspects, the techniques described herein relate to a system, wherein at least one of the plurality of second micro mirrors includes a light reflecting area, a member, and a self-leveler.

In some aspects, the techniques described herein relate to a system, wherein at least one of the plurality of second micro mirrors includes a light reflecting area, a bi-material actuator, a self-leveler, and a radiation blocking layer.

In some aspects, the techniques described herein relate to a system, wherein at least one of the plurality of second micro mirrors includes a light reflecting area, and a bi-material actuator.

In some aspects, the techniques described herein relate to a system, wherein at least one of the plurality of second micro mirrors includes a radiation absorption surface.

In some aspects, the techniques described herein relate to a system, wherein the plurality of second micro mirrors includes at least three of the plurality of second micro mirrors.

In some aspects, the techniques described herein relate to a system, wherein the plurality of second micro mirrors is arranged in one or more corners of the micro mirror array.

In some aspects, the techniques described herein relate to a system, wherein at least one of the plurality of second micro mirrors is configured to not rotate according to radiation absorbed in the at least one of the plurality of second micro mirrors.

In some aspects, the techniques described herein relate to a system, wherein the computing device is one of: a server hosted on a cloud computing platform and connected to the communication interface via a computer network; an auxiliary device connected to the communication interface; and an auxiliary device connected to the communication interface via a computer network.

In some aspects, the techniques described herein relate to a radiation imaging apparatus, including: an imaging surface; a light source; an array of micro mirrors, wherein the micro mirrors rotate according to radiation absorbed in the micro mirrors and reflect light from the light source to generate a distribution of reflected light on the imaging surface; wherein the array of micro mirrors includes a plurality of first micro mirrors and a plurality of second micro mirrors, wherein the plurality of first micro mirrors include a first structure and the plurality of second micro mirrors include a second structure, the second structure being different than the first structure, wherein the second structure is configured to correct for one or more environmental influences on the radiation imaging apparatus; a photodetector, wherein the photodetector captures an image of the distribution of reflected light on the imaging surface; a processor coupled to the photodetector; and a communication interface coupled with the processor; and a computing device located separately from the radiation imaging apparatus and in communication with the communication interface.

In some aspects, the techniques described herein relate to a radiation imaging apparatus, wherein more of the plurality of first micro mirrors are present in the array of micro mirrors than the plurality of second micro mirrors.

In some aspects, the techniques described herein relate to a radiation imaging apparatus, wherein the plurality of first micro mirrors each include a radiation absorption surface, a light reflecting area, a bi-material actuator, and a self-leveler.

In some aspects, the techniques described herein relate to a radiation imaging apparatus, wherein at least one of the plurality of second micro mirrors includes a light reflecting area, and a member rigidly attaching the at least one of the plurality of second micro mirrors to a frame.

In some aspects, the techniques described herein relate to a radiation imaging apparatus, wherein at least one of the plurality of second micro mirrors includes a light reflecting area, a member, and a self-leveler.

In some aspects, the techniques described herein relate to a radiation imaging apparatus, wherein at least one of the plurality of second micro mirrors includes a light reflecting area, a bi-material actuator, a self-leveler, and a radiation blocking layer.

In some aspects, the techniques described herein relate to a radiation imaging apparatus, wherein at least one of the plurality of second micro mirrors includes a light reflecting area, and a bi-material actuator.

In some aspects, the techniques described herein relate to a method, including: rotating a plurality of first micro mirrors of a radiation imaging apparatus according to radiation absorbed in the micro mirrors; rotating a plurality of second micro mirrors of a radiation imaging apparatus according to one or more environmental influences on the radiation imaging apparatus independently of radiation absorbed in the micro mirrors; directing light from a light source of the radiation imaging apparatus on the micro mirrors which reflect the light to generate light spots on an imaging surface; capturing, by a photodetector, an image of the light spots reflected on the imaging surface by the micro mirrors; offsetting the rotation of the plurality of first micro mirrors based on the rotation of the plurality of second micro mirrors; and transmitting the rotation of the plurality of first micro mirrors as offset.

FIG. 1A illustrates an apparatus configured to measure a distribution of electromagnetic radiation according to one embodiment.

In FIG. 1A, an electromagnetic radiation sensing apparatus 1 includes an array of micro mirrors 4, a light source 2 to provide light, a lens 3 to direct the light onto the light reflecting areas 13 of the micro mirrors 4, an imaging surface 5 to form an image of light spots reflected by the micro mirrors 4, a photodetector 31 to capture the image form on the imaging surface 5, and an optional radiation filter 6 to filter the incoming radiation r' to generate a distribution of radiation r being absorbed by the radiation absorption surfaces 11 of the micro mirrors 4.

In FIG. 1A, the array of micro mirrors 4 is arranged on a mirror plane 19. For example, the centers of gravity or geometry of the micro mirrors 4 are positioned on the mirror plane 19. The imaging surface 5 is arranged in parallel with the mirror plane 19.

Each of the micro mirrors 4 has a radiation absorption surface 11 facing the radiation r and/or the radiation filter 6. Each of the micro mirrors 4 has a light reflecting area 13 formed on the opposite surface of the radiation absorption surface 11. The light reflecting area 13 functions as a mirror to reflect the light onto the imaging surface 5. The portion of the light reflected by a particular micro mirror 4 is generally distinct and separate from the portions of light reflected by other micro mirrors 4 and thus form, on the imaging surface 5, a distinct light spot that is associated with the particular micro mirror 4.

For example, the light ray 34 from the light source 2 is reflected by the light reflecting area 13 of a micro mirror 4 to form a reflected light ray 35 reaching the light spot 39 on the imaging surface 5.

In FIG. 1A, in the absence of the incoming radiation r', the micro mirrors 4 have initially positions that can be aligned with the mirror plane 19. For example, the center planes of the micro mirror 4 are inside the mirror plane 19; and the radiation surfaces 11 of the micro mirrors 4 are in parallel with the mirror plane 19.

In FIG. 1A, the dotted line 33 represents the position of the light ray reflected by a corresponding micro mirror 4 in the initial dotted line position of the corresponding micro mirror 4. After the micro mirror 4 rotates from the dotted line position 15 to the solid line position 17, the light spot of the corresponding micro mirror 4 moves from the initial location 37 to the current location 39. The measurement of the light spot displacement Y between locations 37 and 39 can be used to compute the angle of the rotation Q of the corresponding micro mirror 4; and since the rotation Q can be proportionately a function of the radiation intensity on the radiation absorption surface 11 of the corresponding micro mirror 4, the measured displacement Y can be used to calculate the radiation intensity on the radiation absorption surface 11 of the corresponding micro mirror 4.

The measurement of the light spot displacement Y can be performed for each micro mirror 4 in the array and used to determine the distribution of the radiation intensity on the array of the micro mirrors 4.

In one embodiment, the photodetector 31 is used to capture the image formed on the imaging surface 5, identify the individual light spots corresponding to the individual micro mirrors 4 in the array, determine the locations of the light spots, and compute the displacements of the respective light spots and thus the light intensity of the radiation intensity on the mirror mirrors 4.

In FIG. 1A, the y-axis is in the direction of the row of micro mirrors 4 and is parallel to the image plane 19; and the light spot displacement Y is on the imaging surface 5 along the y-axis direction. The mirror plane 19 and the imaging surface 5 are separated by a distance along the z-axis that is perpendicular to the mirror plane 19.

In FIG. 1A, the light is directed on the mirror plane 19 with an angle q with the z-axis. Thus, the light generally travels along the direction of the row of micro mirrors 4 onto the mirror plane 19 and after being reflected by the micro mirrors 4, onto the imaging surface 5 along the direction of the row of micro mirrors 4. The light directing device e.g., the lens 3 and the imaging surface 5 are separated apart by a distance along the direction of the row y-axis. Thus, the light directing device e.g., the lens 3 does not interfere with light rays between the micro mirrors 4 and the imaging surface 5. In one embodiment, there are no structural and/or optical components on the light path between the micro mirrors 4 and the imaging surface 5. In another embodiment there can be structural and/or optical components on the light path between the micro mirrors 4 and the imaging surface 5, such as a partially transmissive and partially transparent plane to direct light onto the micro mirrors 4 or onto the imaging surface 5, or on both. Other components to direct light, or change the travel path of light, such collimator, diffraction gratings, beam splitter, etc. are possible.

In FIG. 1A, the imaging surface 5 is in parallel with the mirror plane 19. Thus, when the micro mirrors 4 are in the initial positions that are aligned with the mirror plane 19, the light reflected by different micro mirrors 4 in the array travels equal distances from the respective light reflecting areas 13 of the micro mirrors 4 to the imaging surface 5. As a result, equal rotations of the micro mirrors 4, due to equal radiation r intensity applied on the radiation absorption surfaces 11 of the micro mirrors 4, can result in equal light spot displacement Y on the imaging surface 5. This arrangement can simplify the calibration for computing the light intensity from the light spot displacement Y and/or improve accuracy and/or ensure uniform signal generation and uniform sensitivity in the conversion from radiation intensity to light spot displacement.

Figure 1B:
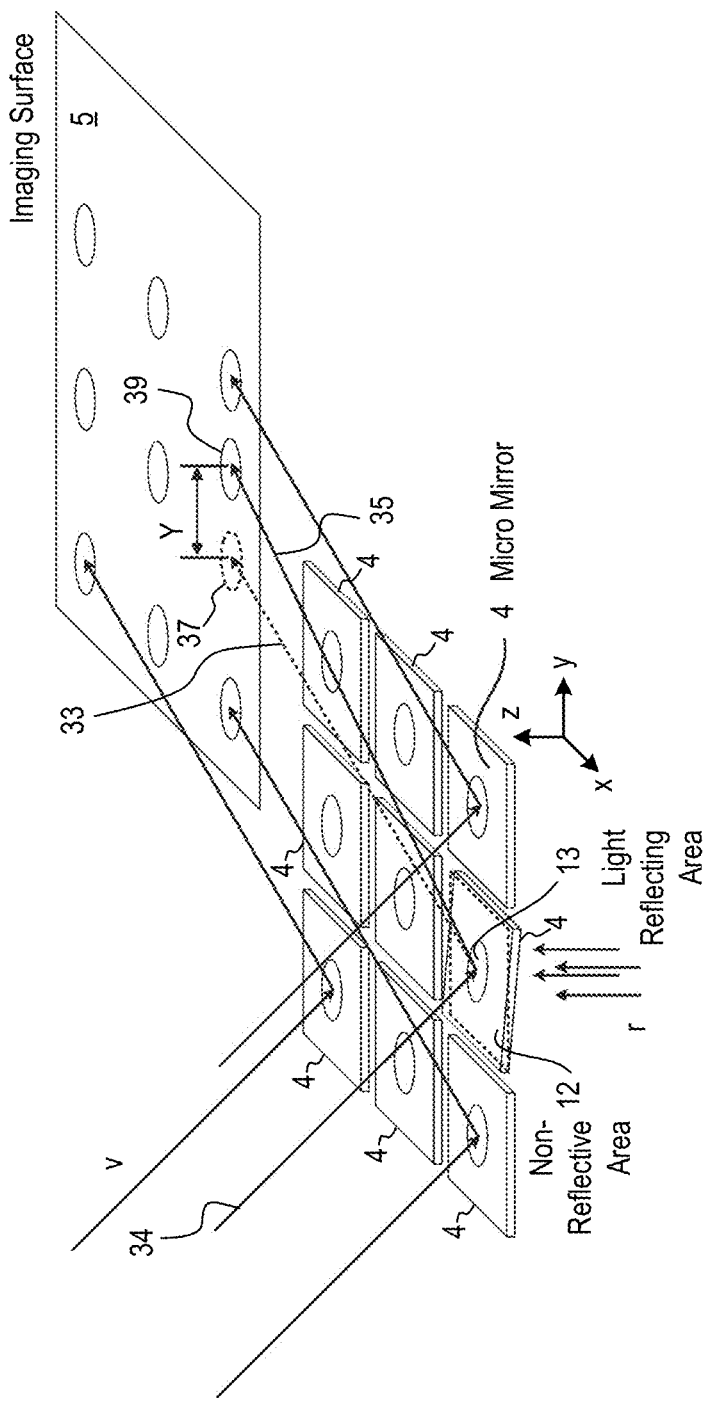
FIG. 1B illustrates the measuring of displacements of reflected light spots on an imaging surface to determine the intensity of electromagnetic radiation at the location of micro mirrors according to one embodiment.

FIG. 1B illustrates the measuring of displacements of reflected light spots on an imaging surface to determine the intensity of electromagnetic radiation at the location of micro mirrors according to one embodiment.

FIG. 1B illustrates an array of 3×3 micro mirrors 4. In general, different numbers of rows and/or columns of micro mirrors 4 can be used in different applications.

FIG. 1B illustrates that each micro mirror 4 has a light reflecting area 13 and a non-reflective area 12 on the surface facing the imaging surface. The shape and size of the light reflecting area 13 of each micro mirror 4 can define the light spot 39 reflected by the corresponding micro mirror 4 on to the imaging surface 5.

Figure 1C:
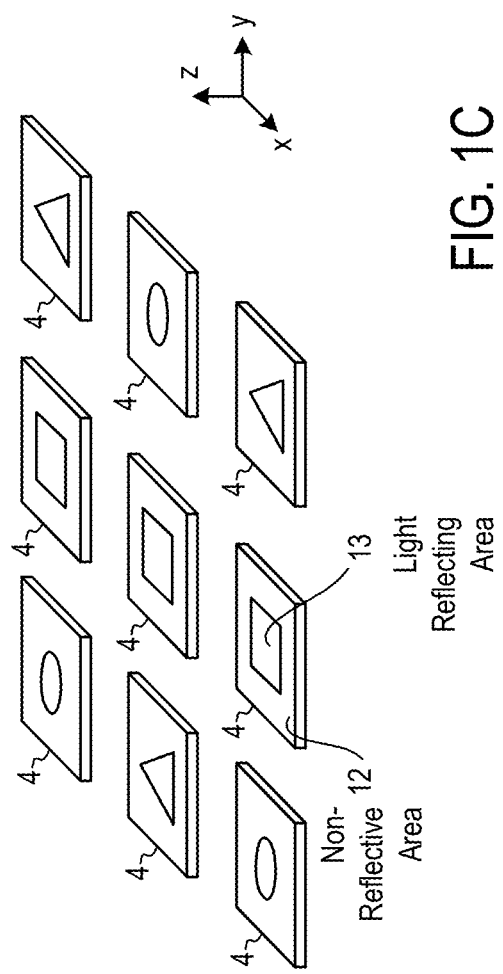
FIG. 1C illustrates an array of micro mirrors having different light reflecting areas according to one embodiment.

In FIG. 1B, the micro mirrors 4 in the array have the same shape and size in their light reflecting areas 13. Alternatively, different micro mirrors 4 in the array may have different shapes and/or sizes in their light reflecting areas 13, as illustrated in FIG. 1C, resulting different reflected light spots on the imaging surfaces. The different optical characteristics of the light reflecting areas 13 can be used to improve the accuracy in correlating the light spots on the imaging surface 5 with the corresponding micro mirrors 4 responsible for reflecting the light spots 39. Different optical characteristics can be achieved by using varying the shape, size, reflection rate, orientation, and/or polarization, etc. of the light reflecting areas 13. Further, symbols or graphical patterns can be applied e.g., etched or overlaid on the light reflecting areas 13 to mark the micro mirrors 4 such that the micro mirrors 4 responsible for generating the light spots on the imaging surface 5 can be identified from the shape, size, orientation, polarization, intensity and/or markers of the corresponding light spots captured on the imaging surface 5.

Similar to the arrangement in FIG. 1A, the micro mirrors 4 are arranged in a mirror plane formed by the x-axis and y-axis x-y plane. The mirror plane and the imaging surface 5 are separate by a distance along the z-axis. The light rays e.g., 34, 33, 35 can travel within the planes parallel to the y-axis and the z-axis or only parallel to each other. The parallel incoming rays 34 reflected by the light reflecting areas 13 of the micro mirrors 4 may or may not be parallel to each other when traveling from the light reflecting areas 13 to the imaging surface 5, depending on the rotations of the micro mirrors 4. When the micro mirrors 4 have the same amount of rotation e.g., due to the uniform radiation r, the reflected lights can be parallel to each other and causes the equal light spot displacement Y, as illustrated in FIG. 2A.

Figure 2A:
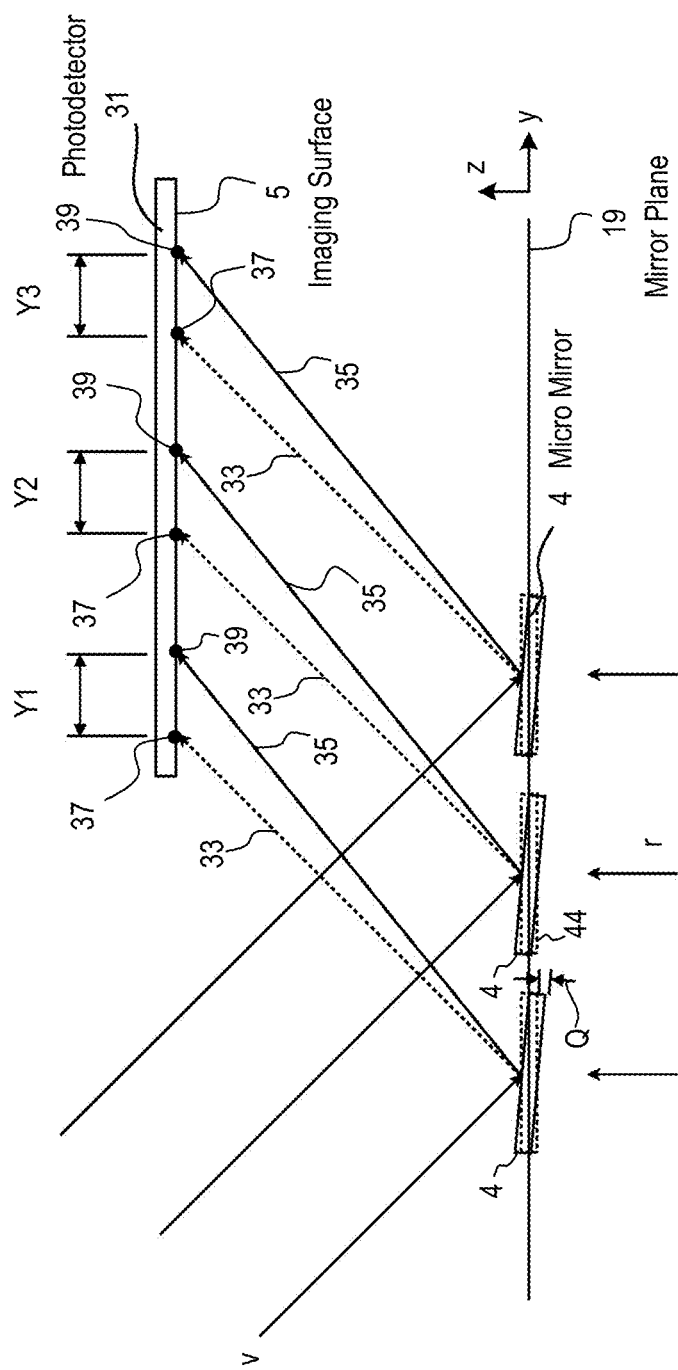
FIG. 2A illustrates a configuration of micro mirrors and an imaging surface to produce equal displacements of reflected light spots on an imaging surface for equal rotations of micro mirrors according to one embodiment.

FIG. 2A illustrates a configuration of micro mirrors and an imaging surface to produce equal displacements of reflected light spots on an imaging surface for equal rotations of micro mirrors according to one embodiment. Equal displacements represent equal sensitivity of the micro mirrors 4 in converting the radiation to light spot displacements.

In FIG. 2A, the imaging surface 5 is in parallel with the mirror plane 19. In absence of the radiation r, the micro mirrors 4 are aligned in the mirror plane 19, as indicated by the dotted lines 44; and the reflected lights 33 generated by the parallel incoming light are also parallel to each other between the micro mirrors 4 and the imaging surface 5, creating on the imaging surface 5 light spots that have spacing corresponding to the spacing of the micro mirrors 4.

In FIG. 2A, when the uniform radiation r causes the uniform rotation Q of the micro mirrors 4, the micro mirrors 4 tilt with an angle Q out of the mirror plane 19, as indicated by the solid lines 4; and the reflected lights 35 generated by the parallel incoming light are also parallel to each other between the micro mirrors 4 and the imaging surface 5, creating uniform light spot displacements Y1, Y2, Y3 on the imaging surface 5. The uniform light spot displacements Y1, Y2, Y3 can correspond to the uniform radiation r provided on the absorption surface 11 of the micro mirrors 4.

In FIG. 2A, non-uniform radiation r provided on the absorption surface 11 of the micro mirrors 4 generally causes different mirror rotations Q and different light spot displacements Y1, Y2, Y3.

Figure 2B:
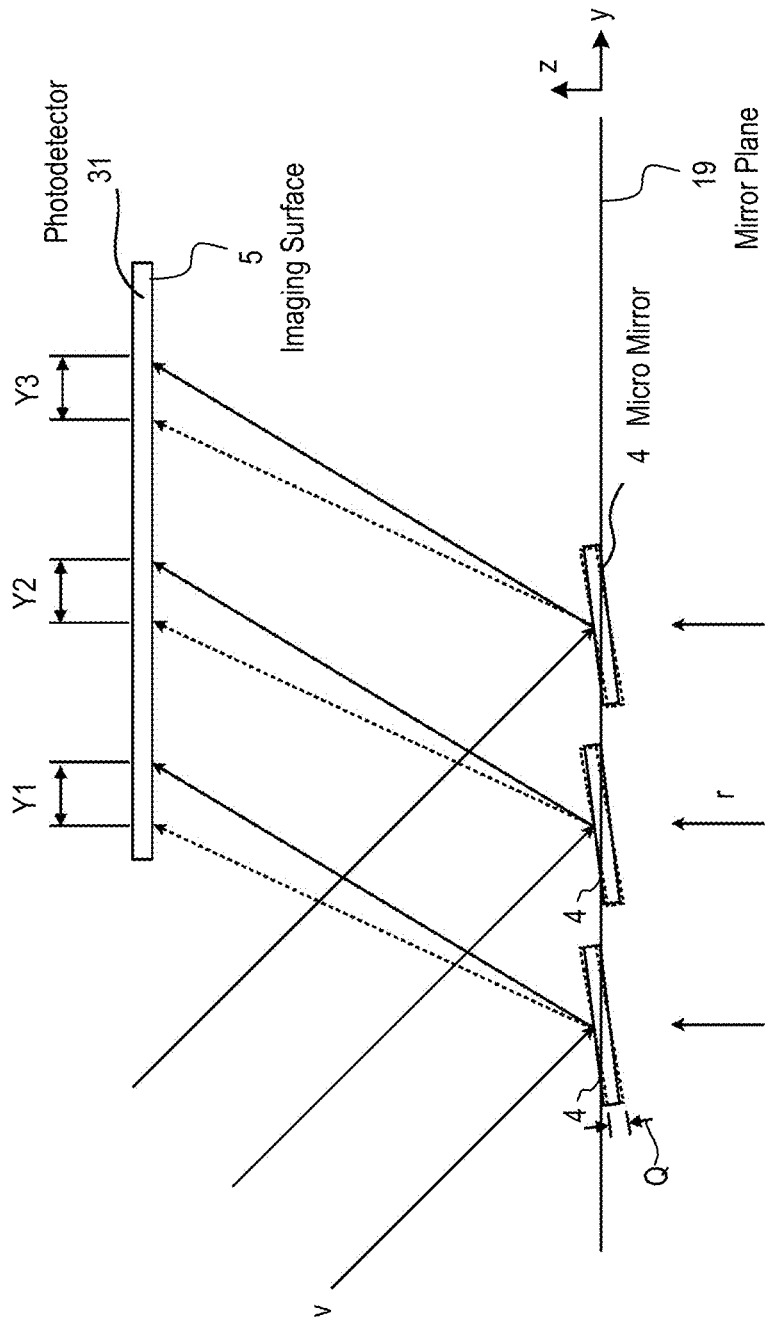
FIG. 2B illustrates another configuration of micro mirrors and an imaging surface to produce equal displacements of reflected light spots on an imaging surface for equal rotations of micro mirrors according to one embodiment.

FIG. 2B illustrates another configuration of micro mirrors 5 and an imaging surface to produce equal displacements of reflected light spots on an imaging surface for equal rotations of micro mirrors according to one embodiment.

In FIG. 2B, in absence of the radiation r, the micro mirrors 4 are not aligned in the mirror plane 19, as indicated by the dotted lines 44, but can have the an initial out-of-plane rotation relative to the mirror plane 19; and, the reflected lights 33 generated by the parallel incoming light can be also parallel to each other between the micro mirrors 4 and the imaging surface 5, creating on the imaging surface 5 light spots that have spacing corresponding to the spacing of the micro mirrors 4 on the mirror plane 19. In another embodiment the micro mirrors 4 do not have to have same initial out-of-plane rotation relative to the mirror plane 19, but each micro mirror 4 can have a different, however similar initial out-of-plane rotation, whilst the center of gravity of each micro mirror 4 lies substantially within the mirror plane 19, Similar to FIG. 2A, when the uniform radiation r causes the uniform rotation Q of the micro mirrors 4 in FIG. 2B, the micro mirrors 4 tilt with an angle Q relative to their initial positions out of the mirror plane 19, as indicated by the solid lines 4; and the reflected lights 33 generated by the parallel incoming light are also parallel to each other between the micro mirrors 4 and the imaging surface 5, creating uniform light spot displacements Y1, Y2, Y3 on the imaging surface 5. The uniform light spot displacements Y1, Y2, Y3 correspond to the uniform radiation r provided on the absorption surface 11 of the micro mirrors 4.

Figure 2C:
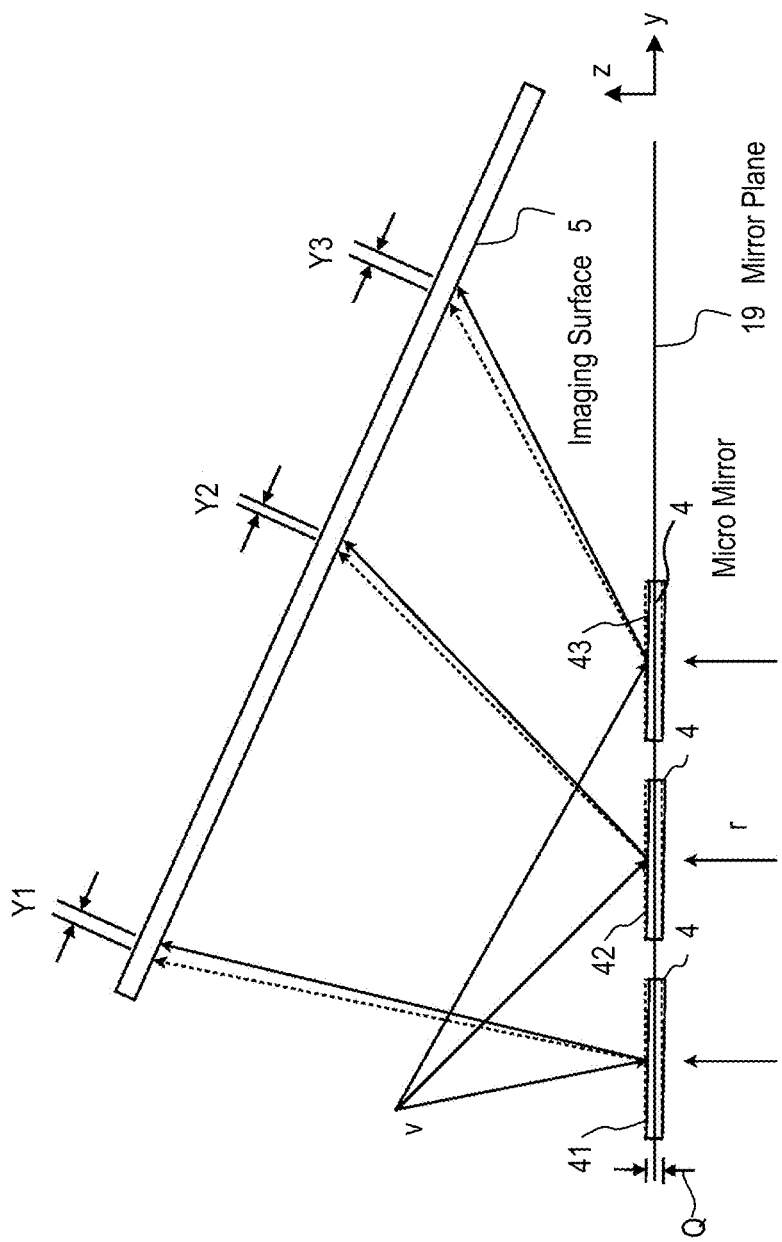
FIG. 2C illustrates a further configuration of micro mirrors and an imaging surface to produce minimal displacements deviation of reflected light spots on an imaging surface for equal rotations of micro mirrors upon non-collimated illumination according to one embodiment.

FIG. 2C illustrates a further configuration of micro mirrors and an imaging surface to produce minimal displacements deviation of reflected light spots on an imaging surface for equal rotations of micro mirrors upon non-collimated illumination according to one embodiment.

In FIG. 2C, the mirror plane 19 and the imaging surface 5 are not parallel to each other. The projection of the incoming light rays v on to the micro mirrors 4 is not parallel. Such non-collimated projection can be created with a point light source or through a beam splitter, or through a misaligned collimator. Further such projection can be created without utilizing any lenses between the point source and the micro mirrors 4. A non-collimated projection will result in a different illumination angle of incident of each micro mirror 41, 42, 43. Hence a spatial arrangement between the micro mirror plane 19 and the imaging surface 5, where same rotations Q of the micro mirrors 4 will generally result in different light spot displacements Y1, Y2, Y3. However, preferably the micro mirror plane 19 and the imaging surface 5 are arranged such that with corresponding projection angles of the incoming light rays v on to the micro mirrors 4 when the micro mirrors 4 have the same rotation Q of a predetermined amount e.g., 1 degree rotation from the unradiated mirror position, the corresponding light spot displacements of the two outermost micro mirrors 41 and 43 of a row or at least three outermost corner micro mirrors in an array Y1, Y3 can be substantially equal to each other. Hence, when uniform radiation r causes the uniform rotation Q of the micro mirrors 4, the light spot displacement of any micro mirrors between the two outermost micro mirrors 41 and 43 in a row will can be smaller than the two substantially equal light spot displacements of the two outermost micro mirrors 41 and 43. Such arrangement minimizes light spot displacement deviations when uniform radiation r causes the uniform rotation Q of the micro mirrors 4 that are illuminated with non-collimated light.

Preferably, the micro mirrors 41 and 43 located at the beginning and the end of the row of micro mirrors 4 have the same light spot displacements Y1 and Y3 when the micro mirrors 41 and 43 rotate the same amount e.g., 1 degree from the unradiated mirror position dotted line positions. Such configuration can be achieved when the two outermost micro mirrors 41 and 43 in a row have substantially equal light spot displacements upon a rotation of the same amount e.g., 1 degree. In one embodiment, at least three outermost micro mirrors 4 e.g., located at the corners of the array in the mirror plane 19 are configured to have substantially equal light spot displacements upon a rotation of a predetermined amount e.g., 1 degree.

More preferably, the micro mirrors 41, 42 and 43 located at the beginning, in the middle, and at the end of the row of micro mirrors 4 have the most minimal light spot displacements deviation Y1, Y2 and Y3 when the micro mirrors 41, 42, and 43 rotate the same amount e.g., 1 degree from the unradiated mirror position dotted line positions. Such configuration can be achieved when the two outermost micro mirrors 41 and 43 in a row are configured to have substantially equal light spot displacements upon a rotation of a predetermined amount e.g., 1 degree. Micro mirrors 4 arranged in an array in the mirror plane 19 can have at least three outermost micro mirrors e.g., corner having substantially equal light spot displacements upon a rotation of the same amount e.g., 1 degree.

FIG. 2C illustrates an example of adjusting the projection angle of the incoming rays v to minimize the light spot displacement deviations Y1, Y2 and Y3 of the corresponding micro mirrors 41, 42 and 43. Alternatively, or in combination, the initial positions of the micro mirrors 4 can be configured to minimize the light spot displacement deviations Y1, Y2 and Y3 for a predetermined amount of rotation caused by the same radiation provided on the respective micro mirrors 4.

Figure 3A:
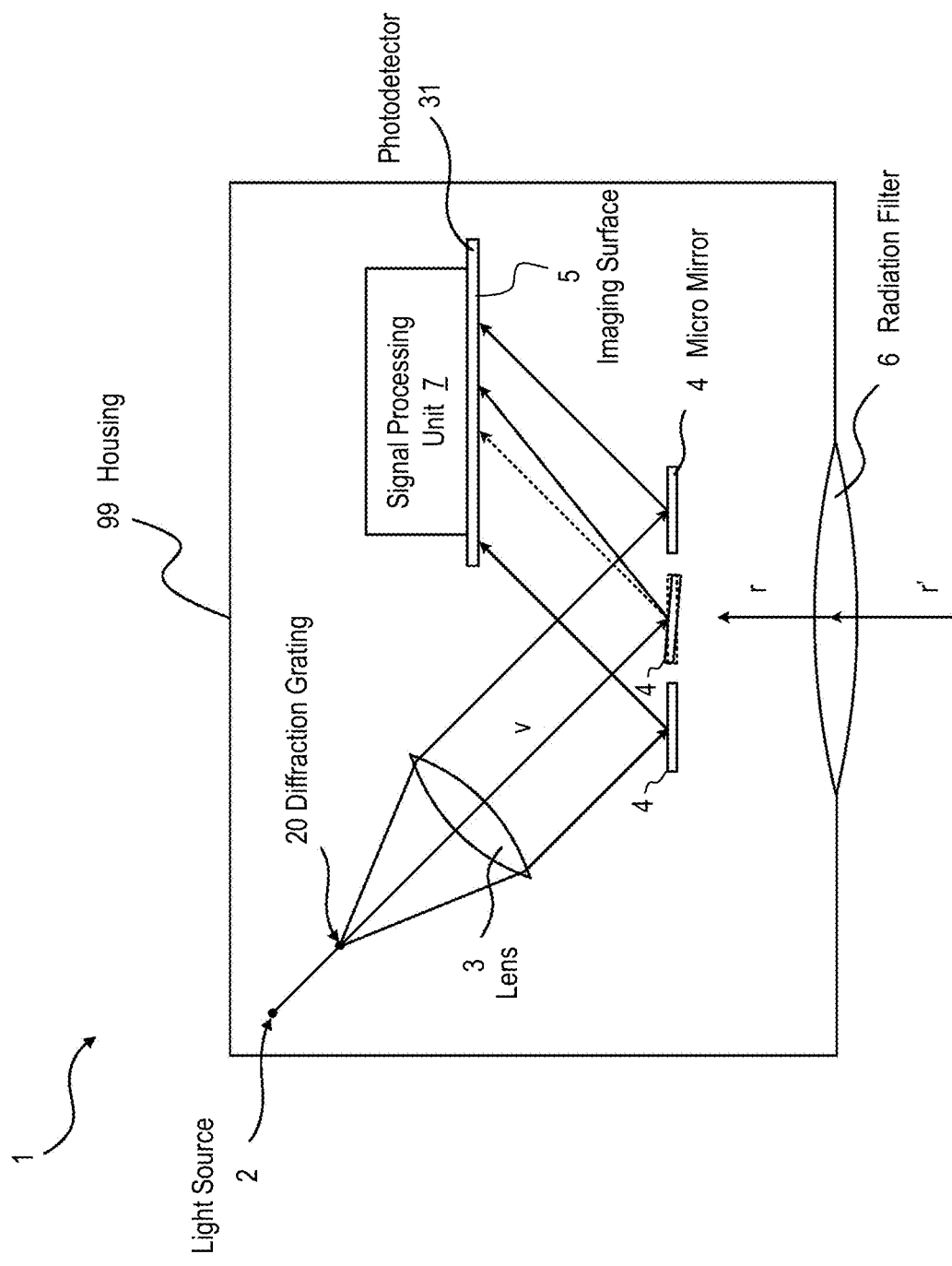
FIG. 3A illustrates a radiation sensing apparatus according to one embodiment.

FIG. 3A illustrates a radiation sensing apparatus according to one embodiment. The radiation sensing apparatus 1 illustrated in FIG. 3A has a housing 99 enclosing a light source 2, a diffraction grating or a beam splitter 20, a lens 3, an array of micro mirror 4, a photodetector 31 having an imaging surface 5, a signal processing unit 7 and a radiation filter 6.

In some embodiments, the radiation sensing apparatus 1 further includes a signal transmitting unit coupled with the signal processing unit 7 to transmit the image data captured by the photodetector 31 and/or the measuring data processed by the signal processing unit 7 indicating the light spot displacements Y, the mirror rotations Q and the intensity of the radiation r.

In FIG. 3A, the micro mirrors 4 and the imaging surface 5 are arranged to have ideally equal light spot displacements or minimized displacement deviation for equal mirror rotations caused by equal radiation intensity e.g., as illustrated in FIGS. 2A, 2B, and 2C.

In FIG. 3A, the plane of the micro mirrors 4 and the imaging surface 5 are parallel to each other; and the diffraction grating 20 is disposed at the focal point of the lens 3 to direct parallel light rays v to the micro mirrors 4. When the micro mirrors 4 and the imaging surface 5 are arranged in an angle as illustrated in FIG. 2C, a point light source 2 e.g., created via the diffraction grating 20 may be used without the lens 3, or with the lens 3 where the diffraction grating 20 is not disposed at the focal point of the lens 3.

In one embodiment, the radiation filter 6 includes a radiation imaging lens e.g., an infrared lens made of e.g., Germanium, Silicon, polymer, and the like. The radiation imaging lens is arranged in relation with the micro mirrors 4 to form an image of the radiation e.g., infrared radiation on the plane of the micro mirrors 4. Thus, the radiation intensity corresponding to the light spot displacement on the imaging surface 5 produced by a micro mirror 4 corresponds to the intensity of a pixel of the radiation image form via the radiation filter 6 at the location of the respective micro mirror 4.

Some of the figures, such as FIG. 1A, FIG. 2A, FIG. 2B, and FIG. 3A illustrate implementations where that the imaging surface 5 is arranged on a surface of the photodetector 31, some embodiments provide an imaging surface that is separate and/or remote to an imaging sensor configured to capture the image formed on the imaging surface.

Figure 3B:
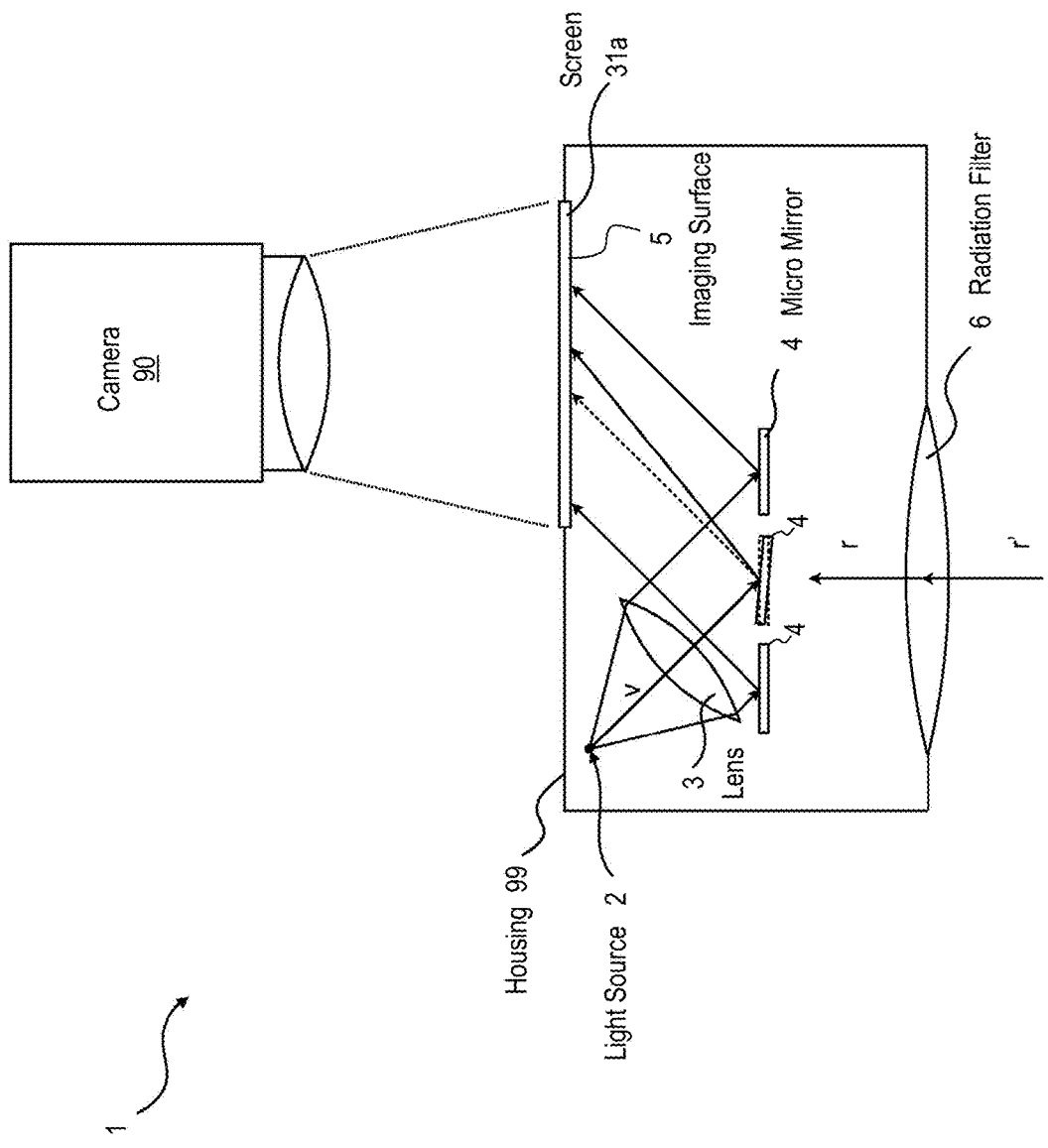
FIG. 3B illustrates another radiation sensing apparatus according to one embodiment.
Figure 3C:
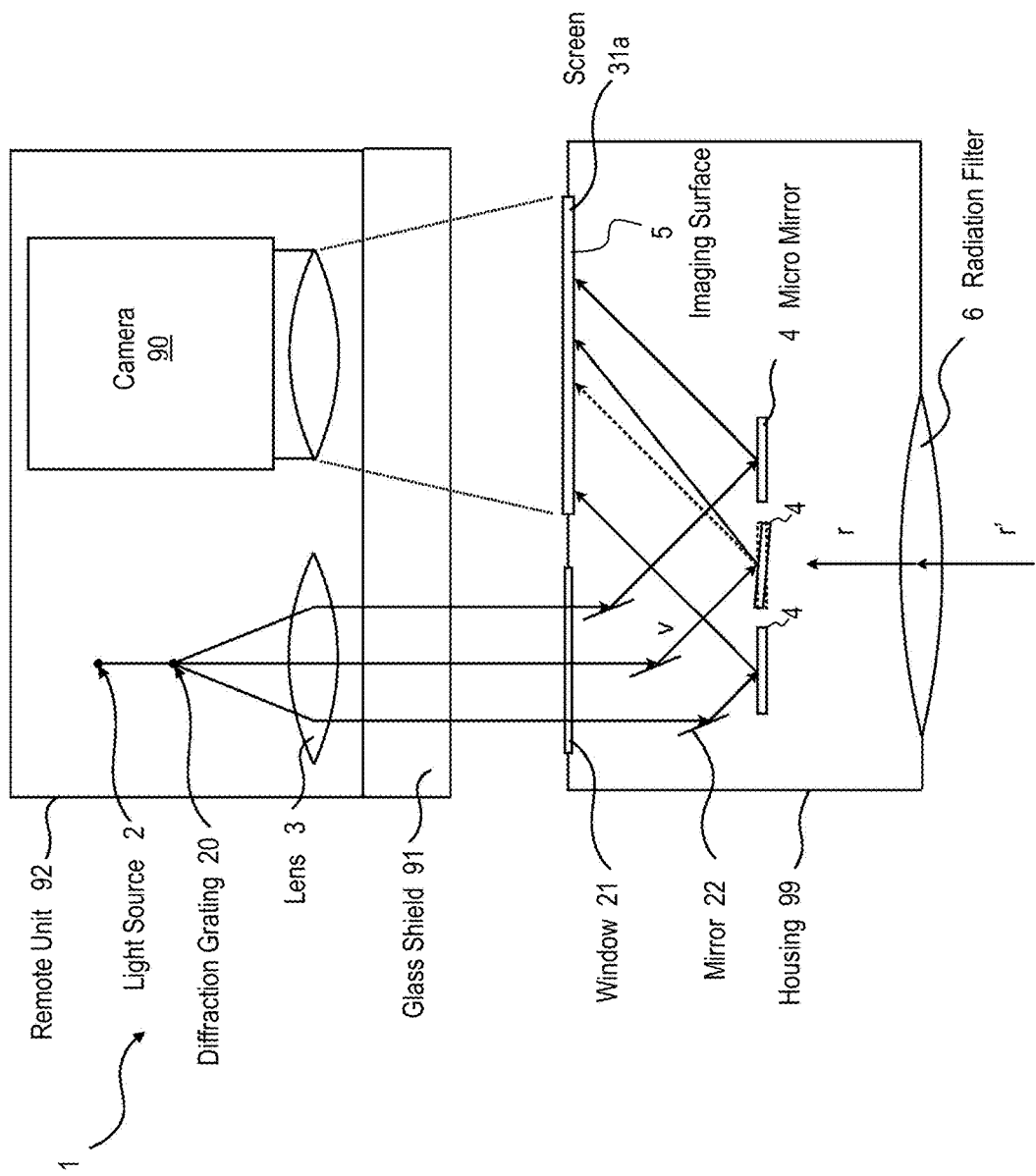
FIG. 3C illustrates a further radiation sensing apparatus according to one embodiment.

For example, the imaging surface can be implemented as a semi-transparent screen; and a remote camera can be used to photograph or record the light sport image formed on the semi-transparent screen from a distance to measure the light spot displacements Y, as illustrated in FIGS. 3B and 3C.

FIG. 3B illustrates another radiation sensing apparatus according to one embodiment. In FIG. 3B, the radiation sensing apparatus has two separate units, including an imaging unit housed in housing 99 and a remotely positioned camera 90 configured to capture the light spot image formed on the imaging surface 5.

In FIG. 3B, the light spot image is formed on the imaging surface 5 of e.g., a semi-transparent screen 31*a* mounted on a window of the housing 99.

Similar to FIG. 3A, the housing 99 in FIG. 3B encloses a light source 2, a diffraction grating 20, a lens 3, an array of micro mirror 4, and a radiation filter 6. However, instead of having enclosed a photodetector 31 and a signal processing unit 7 in a way as illustrated in FIG. 3A, the housing 99 in FIG. 3B has a window to mount the semi-transparent screen 31*a*. The light spot image formed on the imaging surface 5 of the screen 31*a* can be captured by the remote camera 90 for the determination of the light spot displacement Y, the mirror rotation Q, the intensity of the radiation r.

In some embodiments, the remote camera 90 includes signal processing unit 7 configured to detect the light spots generated by the respective micro mirrors 4 from the photo image of the screen 31*a* captured by the camera and compute the radiation intensity at the locations of the micro mirrors 4.

FIG. 3C illustrates a further radiation sensing apparatus according to one embodiment. In FIG. 3C, the remote unit 92 includes not only the camera 90, but also the light source 2, the diffraction grating 20 and lens 3, protected by a glass shield 91. Since the sensitive and/or costly elements are protected in a remote unit 92, the imaging unit housed in the house 99 can be used in a harsh environment.

In FIG. 3C, the housing 99 includes a window 21 to receive parallel light rays formed by the light source 2, the diffraction grating 20 and the lens 3 in the remote unit 92. A set of mirrors 22 is used to direct the parallel light rays onto the micro mirrors 4 to generate the light spot image on the imaging surface 5 of the semi-transparent screen 31*a*. The radiation filter 6 forms a radiation image on the radiation absorption surfaces 11 of the micro mirrors 4, which rotate proportionately to the absorbed radiation.

In FIG. 3C, the camera 90 is configured to capture the light spot image formed on the imaging surface 5 of the screen 31*a*.

FIG. 3C illustrates an example in which the screen 31*a* is mounted on a window of the housing 99. Alternatively, the screen 31*a* having the imaging surface 5 can be configured inside the housing 99 viewable through a transparent window e.g., configured at the window where the screen 31*a* is mounted in FIG. 3C.

FIG. 1C illustrates an array of micro mirrors having different light reflecting areas according to one embodiment. The different light reflecting areas 13 of different micro mirrors 4 causes the light spots 39 formed by the light reflected by the respective micro mirrors 4 to have different shapes. Thus, ambiguities in identifying the light spots formed by different micro mirrors 4 can be resolved based on the association of the shapes of the micro mirrors 4 and the shapes of the light spots 39.

In FIG. 1C, different light reflecting areas 13 are configured to at least distinguish the light spots generated by the adjacent micro mirrors 4 in a row of micro mirrors 4 along the y-axis in the direction where the light spots travel the displacement Y in response to the rotation Q of micro mirrors 4 caused by the absorption of the energy of the radiation r. In some implementations, each micro mirror 4 in a row of micro mirrors 4 is individualized with an optical marking such that the light spot generated by the respective micro mirror 4 can be distinguished from the light spots generated by other micro mirror 4 in the row. In general, the light spots of different rows of the micro mirrors 4 may also be optionally marked with different optical characteristics. Further, different optical characteristics of the light spots can also be created at least in part via the light directing component of the apparatus.

The radiation sensing apparatus discussed above have many applications, such as non-visual environment monitoring and monitoring of human presence for security and safety, energy savings, fire detection, people counting and behavior analysis. The radiation sensing apparatuses may use the infrared sensing technology in general and more particular uncooled thermal imaging.

In one embodiment, a radiation sensing apparatus includes a radiation detection sensor including a plurality of micromechanical radiation sensing pixels having a reflecting top surface and configured to deflect light incident on the reflective surface as a function of an intensity of sensed radiation. In some implementations, the apparatus can provide adjustable sensitivity and measurement range. In some implementations, the apparatus can provide adjustable spectral and multi-spectral sensing abilities. The apparatus can be utilized for human detection, fire detection, gas detection, temperature measurements, environmental monitoring, energy saving, behavior analysis, surveillance, information gathering and for human-machine interfaces.

Details of one or more implementations of the subject matter described in this specification are set forth in the accompanying drawings and the description. Other features, aspects, and advantages will become apparent from the description, the drawings, and the claims. Note that the relative dimensions of the following figures may not be drawn to scale. Like reference numbers and designations in the various drawings indicate like elements.

Non-visual environment monitoring and monitoring of human presence can be utilized in applications for security and safety, energy savings, fire detection, people counting and behavior analysis. One technology used for these kinds of applications is infrared technology, in particular uncooled thermal imaging. Every object in our environment has a unique thermal footprint and therefore thermal imaging offers detection of human presence in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging with a limited spatial resolution can be sufficient to accurately detect humans at short distances without revealing the individual's identity. This aspect of environmental and human detection and monitoring is of general interest with regards to privacy protection. Current thermal imaging technology solutions are inadequate for low-cost, high-volume applications due to their production complexity and expense. A need exists for ubiquitous limited spatial resolution infrared imagers at a commodity price. One example of a potentially inexpensive thermal imager with a limited spatial resolution is based on an uncooled thermo-mechanical bi-material microelement sensor, which converts incident infrared radiation into a micromechanical displacement. The microelement is often referred to as a micro-cantilever or micro-mirror. The operational principle is based on the bi-material effect, where a material compound mismatch of coefficients of thermal expansion leads to a micromechanical motion upon temperature change. In some implementations one microelement represents one radiation sensing pixel and the entire sensors consists of an array of microelements.

Referring to FIG. 3A, the electromagnetic radiation detector 1 includes a housing 99 with a light source 2, a lens or collimator 3, an array of micro mirrors 4, a photodetector 31 with an imaging surface 5 and a radiation filter 6. Generally, the photodetector 5 converts light into electrical signals to detect the position of the light spots of generated by the lights reflected by the micro mirrors 4 that forms a micromechanical pixel array.

In one embodiment, each micro mirror 4 is a micromechanical radiation sensing pixel having a reflecting top surface and a radiation absorbing bottom surface. The micro mirrors 4 are arranged in a two-dimensional array. The micromechanical radiation sensing pixels exhibit a reversible micromechanical displacement of the reflecting top surface upon radiation absorption. The initial incident radiation passes through the filter 6 whereupon at least one characteristic of radiation is altered and the filtered radiation is provided on the micro mirror 4.

In some implementations the micromechanical pixel array of micro mirrors 4 can be enclosed in a specific operational pressure or gas sealing with transparent optical windows on the top and the bottom of the sealing chamber.

The light source 2 is illuminating the top surface of the micro mirrors 4 with light rays v. The reflectors e.g., the light reflecting area 13 of the micromechanical radiation sensing pixels e.g., the micro mirrors 4 reflect the illuminated light rays v onto the imaging surface 5 of the photodetector 31. Between the light source 2 and the micro mirrors 4 is positioned a collimator or lens 3 which collimates and produces substantially parallel light rays v to fall onto the micro mirrors 4. The illumination of the topside of the micromechanical pixel array by the light rays v does not substantially influence, actuate, displace or rotate the reflectors of the micro mirrors 4. The reflectors of the micro mirrors 4 generate an angular motion primarily due to local temperature rise upon absorption of the radiation r. The temperature dependent actuation of the micro mirror can be generally implemented via a bi-material effect for temperature sensing.

As illustrated in FIG. 1A, the collimated light rays as marked with v fall onto the reflectors of the micro mirrors 4 with a fixed angle of incidence q and are reflected with an angle of reflection and fall onto the imaging surface 5 of the photodetector 31. Initially the reflected light rays have substantially identical collimated arrangement as the incident light rays.

In the schematic illustration of FIG. 1B, an array of 3×3 micromechanical pixels is demonstrated as a sensor array. More or less pixels can be used in various embodiments. In FIG. 1B, a micro mirror 4 exhibits an angular displacement upon backside irradiation with radiation intensity r. In some implementations the amount of the tilt of the micro mirror 4 corresponds to the amount of absorbed radiation intensity. The micromechanical motion of the micro mirror 4 of the corresponding pixel is generated by absorption of irradiated electromagnetic radiation from the bottom side. The absorbed irradiation generates a temperature increase on the micro-structure, where a bi-material actuator induces an angular micromechanical motion.

Due to the position change in the reflector of the micro mirror 4, the corresponding light ray 33 undergoes an angle of reflection change by the angular amount and the displaced reflected light ray is illustrated as ray 35. The initial positions of the micro mirror 4 and the reflected light ray 33 are shown in FIG. 1B dotted lines. The micromechanical angular displacement is translated to a light ray displacement Y, which is detected via the photodetector 31. In one embodiment, the imaging surface 5 of the photodetector captures the incident light rays as light spots of a specific diameter. The light spots 37, 38 are schematically illustrated in FIG. 1B as round features. In conclusion the incident radiation intensity r is translated via a micromechanical displacement and an optical setup into a light spot displacement Y on an imaging surface 5 captured by a photodetector 31.

The electromagnetic radiation detector 1 includes a radiation filter 6 which has at least one radiation filtering capability. The filter 6 may change the bandwidth, spectral intensity, etc. of the filtered radiation. In some implementations, the filter 6 can be an optical window consisting of a specific material such as Germanium, Silicon, polymer, chalcogenide glass, etc. In addition, the optical window material may include optical coatings or gratings. In some implementations, the optical radiation filter 6 can be a radiation imaging lens that images incident irradiation onto the radiation absorption side of the micro mirrors 4. The filter ability is not limited to any wavelength or wavebands. For example, the radiation filter 6 may be a Germanium imaging lens including an antireflective optical coating for the long wave infrared region LWIR. Another example can include only a plane Silicon optical window covered with a narrowband optical transmission coating that is transparent only to a specific wavelength. The latter example can be used as a gas sensor or for multiband sensing with several detectors, where each detector is sensitive to one specific wavelength. First example can be used for example for thermal imaging of human presence.

In one embodiment, the radiation filter 6 is an exchangeable part of the electromagnetic radiation detector 1. For example, one radiation filter 6, which is highly transparent in the LWIR region can be manually or automatically exchanged with a radiation filter 6 that is, for example, transparent for only the mid wave infrared MWIR region. With such apparatus the end user has a liberty to adapt the detector easily and conveniently to the detecting and sensing needs of the users.

In one embodiment, the radiation filter 6 includes one or more spectral filtering abilities. The radiation filter 6 includes multiple parts 6a, 6b, 6c having different transmissivities from each other. The sizes or the two-dimensional layout of the parts are not restricted by the illustration shown in the drawings. For example, the part 6a can be transparent only to 5 um wavelength and the window 6b can be transparent to only 10 um wavelength. Such apparatus enables multi-spectral sensing and imaging within one detector. The spectral filtering abilities can be achieved either through material selection, optical coating or a combination of both. In some implementation two or more different materials can be combined together to form the radiation filter 6. The filtering ability can be selected with regard to the designated application fields and/or to the sensing and detecting needs of the users.

In one embodiment, an optical filter e.g., the linear variable filter 10 is integrated into the lens or collimator 3. For example, a linear variable neutral density filter is integrated on the backside of a collimating biconvex lens 3. The shape of the lens including a filter is not limited to a biconvex lens. It can include any kind of optical element for collimating and then filtering the incident light from the light source 2.

In some implementations the lens or collimator 3 can include more than one element. It is not limited to a collimating biconvex, planoconvex or Fresnel lens. In some implementations the light source 2, the lens or collimator 3, and the filter 10 can be one integrated element. Such an element can generate a structured light pattern with a gradient light characteristic in one dimension.

In one embodiment, the detector 1 has an adjustable reflected light ray length. The amount of the captured light ray displacement Y by the micro mirror 4 depends on the light ray length L and the angle of incidence q. Adjusting the reflected light ray length results in the adjustment of the radiation measuring sensitivity and measuring range.

The mechanism 50 to adjust the position of the imaging surface 5 relative to the mirror plane 19 along the initial reflected readout light ray lengths, in a manner that all reflected readout light ray lengths remain substantially identical in length at an initial state, is not limited to a specific embodiment. The mechanism can include rails with manual position fixation elements or it can include an automated drive, which can adjust the position automatically.

In some embodiments, the detector 1 includes not only a housing 99, a light source 2, a collimator 3 with an optical filter 10, an array of micro mirrors 4, a photodetector 31 or a screen 31a with a camera 90, a radiation filter 6, and/or a signal processing unit 7, but also a communication module, a battery, a radiation imaging lens and additional sensor or multi-sensor module including a visual camera for capturing the scene monitored by the micro mirrors 4. In some embodiments, the detector 1 further includes a plural of radiation filtering zones having different transmission characteristics for the simultaneous detection in different wavelengths and bandwidths. Further the radiation filter/lens 6 can be fixed with, for example, a retaining ring. The fixation with a retaining ring is only exemplary and other methods for attaching and exchanging the radiation filter/lens 6 can be used.

In FIG. 3A, the signal processing unit 7 is disposed inside the housing 99. The signal processing unit 7 processes the reflected light spot displacements and generates corresponding electrical signal gains. The signal can be further processed and for example displayed to the end used via an external display. A display and a user interface can be also part of the detector. Further, the signal processing unit 7 can be disposed outside the housing 99 in some embodiments. It can be located externally to the housing 99 and be connected to the photodetector 31 via a wired or wireless connection.

The signal processing unit 7 can be programmed for customized processing of designated applications. For example, for gas sensing applications, the signal processing unit 7 can be programmed in such manner, that an alarm is triggered when a certain wavelength, e.g., corresponding to detection via the filter 6a rises or falls below a certain value. For example, an IR light source can be directed onto the portion of the micro mirrors 4 covered by the filter 6a; and if its detected radiation intensity falls below a certain threshold, then the traceable gas is present in the line of sight. As an example, the filter 6a can be highly transparent to only a bandwidth of about 4.6-4.9 um for carbon monoxide concentration detection. Such spectroscopy measurement method is just one example of the possible uses of the detector 1. The other two filters 6b and 6c this example can be for example MWIR and LWIR transparent respectively.

In one example, the processed signal is transmitted through a communication port wirelessly to a portable device, where the end user can see the generated signals and has the ability to control or interact through a user interface with the detector. The signals can be transmitted and exchanged through any wired or wireless transmission method, using, e.g., a USB, Bluetooth, Wi-Fi, etc. The end user's display and interface can include any device, for example a smartphone, tablet, laptop computer, etc.

In one embodiment, the detector 1 includes a multi-sensor module that includes an array of sensors that additionally detect different physical properties in the surroundings of the detector 1. For example, the multi-sensor module can include a visual imager to capture the detected radiation scenery in the visual band. Further it can include a temperature, humidity and air-pressure sensor. Further it can include a microphone or actuators such as a speaker. As a portable device it can include an acceleration sensor, a position sensor, GPS-module, etc. The sensor module is not limited in the amount or the method of example sensing and actuating devices discussed herein.

In one embodiment, the detector 1 further includes an energy generating unit such as a solar cell, wind turbine, etc. to power the operation of the detector 1. Further, it may include an energy-storing unit such as a battery and/or a user interface. It can also include a data storage unit where processed or raw data may be stored. For example, the detector 1 can include a small solar panel, an exchangeable and chargeable battery and an adapter for a memory card.

In one embodiment, the imaging lens of the radiation filter 6 focuses electromagnetic radiation onto the array of the micro mirrors 4. The imaging lens is demonstrated in this embodiment for schematic purposes only. In some implementations, the imaging lens can include more than one element to focus and image the electromagnetic radiation onto the array of micro mirrors 4. A lens configured for two- or multi-element radiation imaging, referred to as an objective or optical imaging system, can also be used.

One embodiment disclosed herein includes a calibration method. The method starts with reading and storing the initial position of each light spot on the imaging surface 5 in an initial state. Each light spot is initially reflected of the reflecting top surfaces of each micro mirror 4 in an initial, defined irradiated state. Then, the array of the micro mirrors 4 is illuminated with specific calibrated radiation intensity to cause the light spots to change their positions on the imaging surface 5. The new calibrated positions are read and stored. The initial positions can be set as a value for a first defined incident radiation and the calibrated positions for a second defined and calibrated value of incident radiation. Since the responding behavior of the light spot displacement can be linear relative to the radiation, a measured light spot position between the initial position and the calibrated position represents the corresponding fraction of calibrated incident irradiation. This method can be referred to as a two-point calibration of the electromagnetic radiation detector 1. This is one example of how the light spot displacement, which represents an incident radiation intensity value, is converted into an electrical signal gain for signal processing. In some implementations a one-point or multi point calibration method can be applied for calibrating the detector 1.

Example Micro Mirror Structures

Figure 4:
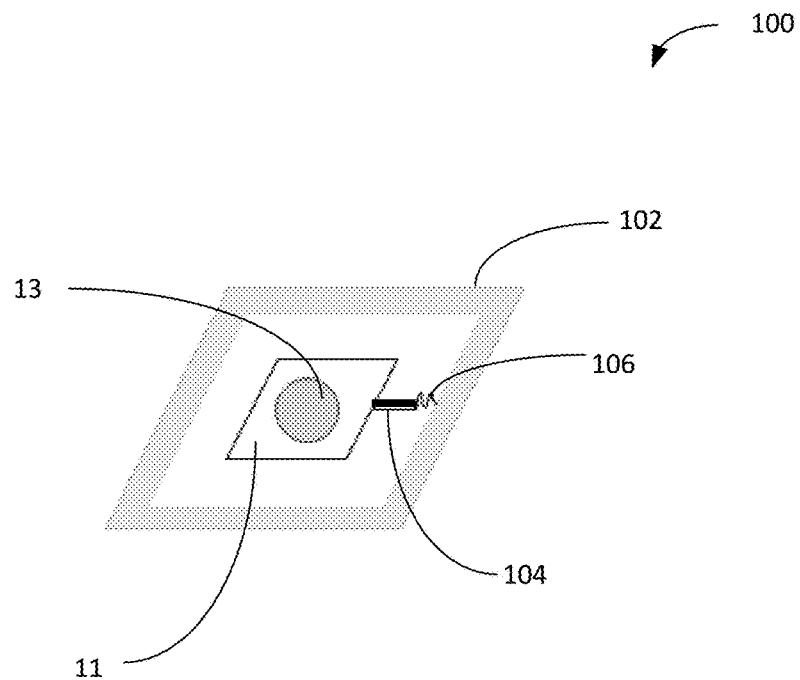
FIG. 4 illustrates a micro mirror according to one embodiment.

FIG. 4 illustrates a micro mirror 100 according to one embodiment. The micro mirror 100 can include features that are the same as, or similar to, those previously described in accordance with FIGS. 1A-3C above. The micro mirror 100 can be used in place of the micro mirror 4. In one embodiment, the micro mirror 100 can be referred to as a standard pixel.

The micro mirror 100 includes a radiation absorption surface 11 and a light reflecting area 13. The micro mirror 100 is attached to a frame 102. In one embodiment, the frame 102 is a structure to which the micro mirror 100 and other micro mirrors within an array of micro mirrors are attached. In one embodiment, the frame 102 is rigid. The micro mirror 100 is attached to the frame 102 via a bi-material actuator 104 and a self-leveler 106. The bi-material actuator 104 can be referred to as a bimorph or the like. The bi-material actuator 104 changes curvature depending on the temperature difference between the radiation absorption surface 11 and the frame 102. The change in curvature causes a rotation of the micro mirror 100. The self-leveler 106 is connected to the bi-material actuator 104 and to the frame 102. The self-leveler 106 can deflect if the bi-material actuator 104 changes curvature in response to the ambient temperature instead of a temperature differential. Thus, the self-leveler 106 can prevent the bi-material actuator 104 from rotating the micro mirror 100 due to the ambient temperature so that the temperature difference between the radiation absorption surface 11 and the rigid frame 102 is determinative of a rotation of the micro mirror 100.

In one embodiment, the micro mirror 100 deflects with electromagnetic radiation. In one embodiment, the micro mirror 100 can deflect based on operating temperature, but also in response to gravity or other acceleration. In one embodiment, the micro mirror 100 can be impacted by external conditions such as, but not limited to, changes in the mechanical and optical components in the system, or the like.

Figure 5:
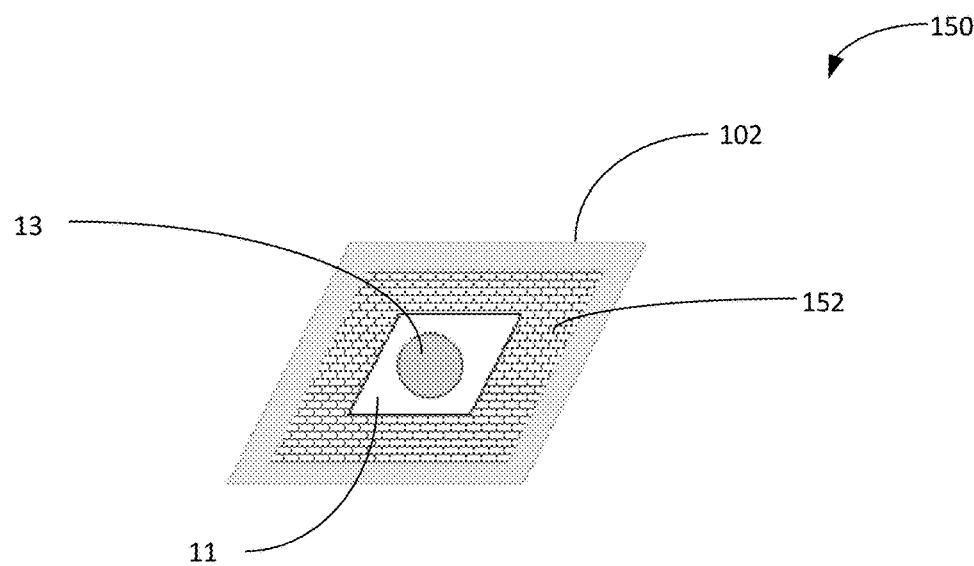
FIG. 5 illustrates a micro mirror according to one embodiment.

FIG. 5 illustrates a micro mirror 150 according to one embodiment. The micro mirror 150 can include features that are the same as, or similar to, those previously described in accordance with FIGS. 1A-4 above. The micro mirror 150 can be used in place of the micro mirror 4. In one embodiment, the micro mirror 150 can be referred to as a reference pixel. In one embodiment, the micro mirror 150 can be referred to as a fixed or anchored pixel. In one embodiment, the micro mirror 150 is configured to not deflect with electromagnetic radiation. In one embodiment, environmental changes may not impact the micro mirror 150. In one embodiment, the micro mirror 150 can be used to correct for a translation, rotation, or magnification change in the detected optical pattern resulting from physical changes or displacements of sensor module components.

The micro mirror 150 includes a radiation absorption surface 11 and a light reflecting area 13. The micro mirror 150 is attached to a frame 102. In one embodiment, the frame 102 is a structure to which the micro mirror 150 and other micro mirrors within an array of micro mirrors are attached. The micro mirror 150 is attached to the frame 102 via a member 152. In one embodiment, the member 152 is rigid. In one embodiment, the rigid member 152 is not intended to deflect based on temperature changes or the like. In the illustrated embodiment, the member 152 is connected to the frame 102 and the micro mirror 150 around a perimeter of the micro mirror 150. In one embodiment, the member 152 can be connected to one or more discrete locations on the micro mirror 150 and one or more discrete locations on the frame 102.

In one embodiment, the micro mirror 150 can be used to measure and correct for a translation, rotation, or magnification in the detected optical pattern. In one embodiment, the micro mirror 150 can be used to account for movements resulting from physical changes or displacements in the sensor modules and corresponding components.

In one embodiment, the radiation absorption surface 12 can be optional. In such an embodiment, the member 152 can be connected to the frame 102 via the light reflecting area 13.

In one embodiment, the micro mirror 150 can correct for signal offsets including a rigid translation in an x or y direction, a rigid rotation, a change in projected size of a light pattern onto the image sensor, combinations thereof, or the like. In one embodiment, the offset can be caused by relative motion of components for the optical readout, including the light source photodetector, micro mirror array, any intermediate components in the light path, combinations thereof, or the like. Motion may be caused by changes in physical properties (for example, volumetric dimensions, refractive index, or the like) of the optical components, or forces acting on the optical components or connecting/supporting materials, which can include rigid bodies, semi-flexible substrates, adhesives, or any combination thereof.

Figure 6:
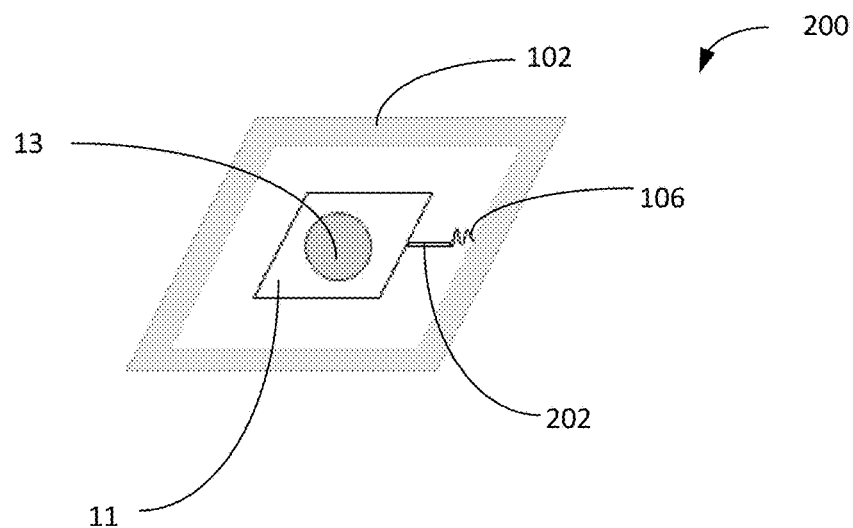
FIG. 6 illustrates a micro mirror according to one embodiment.

FIG. 6 illustrates a micro mirror 200 according to one embodiment. The micro mirror 200 can include features that are the same as, or similar to, those previously described in accordance with FIGS. 1A-5 above. The micro mirror 200 can be used in place of the micro mirror 4. In one embodiment, the micro mirror 200 can be referred to as a reference pixel. In one embodiment, the micro mirror 200 can be referred to as a gravity pixel, an acceleration pixel, force induced pixel, any combination thereof, or the like.

The micro mirror 200 includes a radiation absorption surface 11 and a light reflecting area 13. The micro mirror 200 is attached to a frame 102. In one embodiment, the frame 102 is a structure to which the micro mirror 200 and other micro mirrors within an array of micro mirrors are attached. In one embodiment, the frame 102 is rigid. The micro mirror 200 is attached to the frame 102 via a member 202 and a self-leveler 106. As a result, in one embodiment, the micro mirror 200 can rotate relative to the frame 102 based on changes in acceleration. Radiation and temperature changes do not impact the micro mirror 200 because the member 202 does not include a temperature sensitive element. In one embodiment, a sudden acceleration or vibration e.g., cause by a shock or other force to the micro mirror 200 can induce a rotation of the micro mirror 200.

In one embodiment, the radiation absorption surface 12 can be optional. In such an embodiment, the member 202 can be connected to the frame 102 via the light reflecting area 13.

In one embodiment, the micro mirror 200 can correct for signal offsets including translation of a light pattern; change in shape, contrast, or intensity of the light pattern; or any combination thereof. In one embodiment, the signal offset can be the result of a change in 3D conformation of the micro mirror 200 and its supporting structures. In one embodiment, acceleration in any direction can cause such a change.

Figure 7:
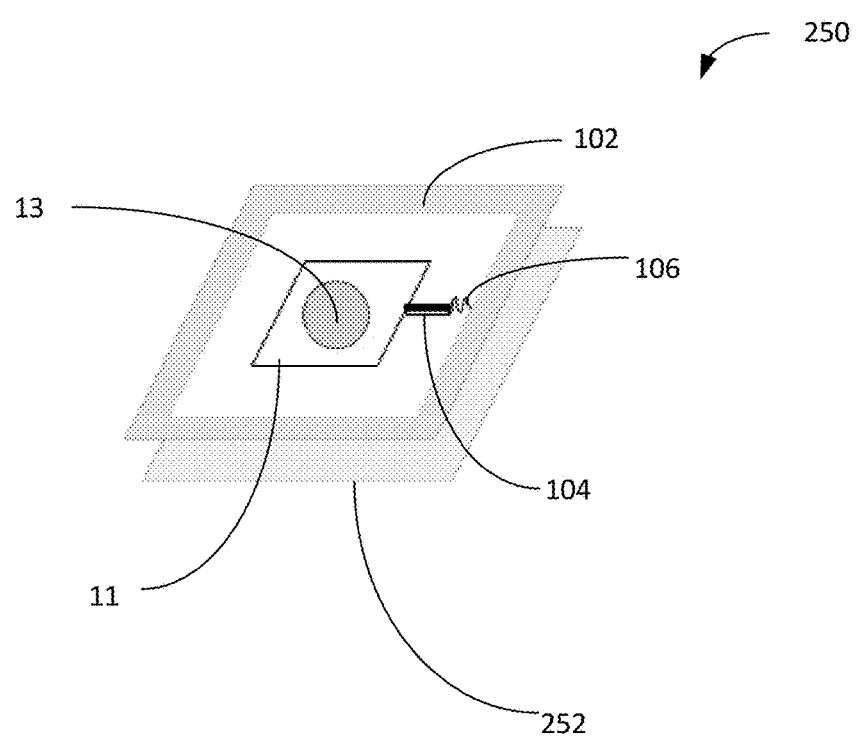
FIG. 7 illustrates a micro mirror according to one embodiment.

FIG. 7 illustrates a micro mirror 250 according to one embodiment. The micro mirror 250 can include features that are the same as, or similar to, those previously described in accordance with FIGS. 1A-4 above. The micro mirror 250 can be used in place of the micro mirror 4. In one embodiment, the micro mirror 250 can be referred to as a reference pixel. In one embodiment, the micro mirror 250 can be referred to as a temperature pixel or the like.

The micro mirror 250 can generally be the same as the micro mirror 100. The micro mirror 250 includes an additional radiation blocking layer 252. The radiation blocking layer 252 can prevent radiation by absorbing the radiation or reflecting the radiation. In one embodiment, the micro mirror 250 is thus not impacted by changes in temperature via radiation. Instead, the micro mirror 250 is impacted in response to operating temperature. As a result, the micro mirror 250 can rotate in response to an operating temperature. The micro mirror 250 can be used to correct offsets based on operating temperature in one embodiment.

In one embodiment, the radiation absorption surface 12 can be optional. In such an embodiment, the bi-material actuator 104 can be connected to the frame 102 via the light reflecting area 13.

In one embodiment, the micro mirror 250 can correct for signal offsets including translation of a light pattern; change in shape, contrast, or intensity of the light pattern; or any combination thereof. In one embodiment, the signal offset can be the result of a change in temperature of the die on which the micro mirror array is disposed, its surroundings, combinations thereof, or the like. In one embodiment, the signal offset can be caused by a change in ambient temperature, powering a module on from a cold start e.g., as the components heat up, combinations thereof, or the like.

Figure 8:
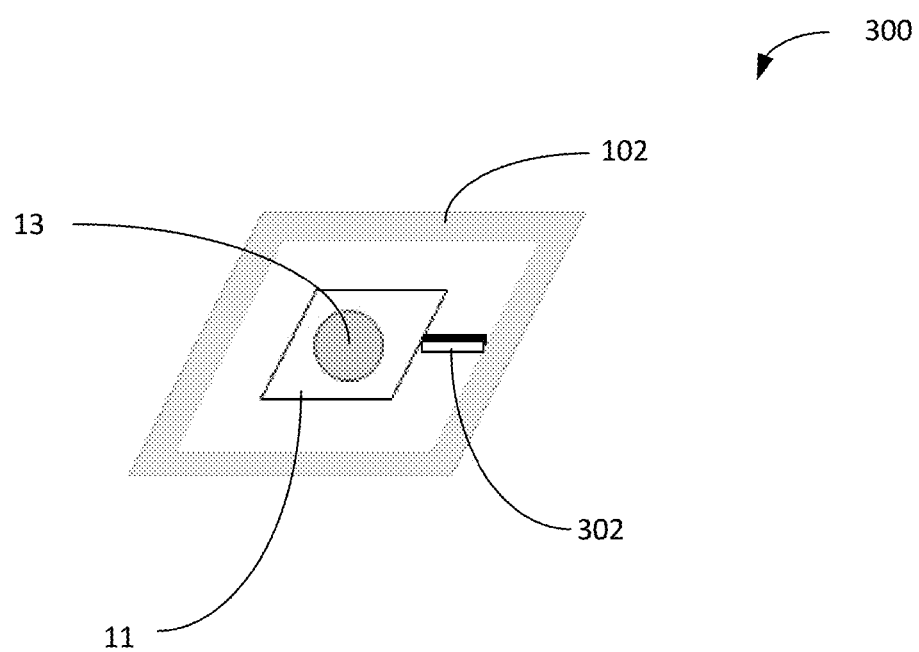
FIG. 8 illustrates a micro mirror according to one embodiment.

FIG. 8 illustrates a micro mirror 300 according to one embodiment. The micro mirror 300 can include features that are the same as, or similar to, those previously described in accordance with FIGS. 1A-4 above. The micro mirror 300 can be used in place of the micro mirror 4. In one embodiment, the micro mirror 300 can be referred to as a reference pixel. In one embodiment, the micro mirror 300 can be referred to as a temperature pixel or the like.

The micro mirror 300 can generally be the same as the micro mirror 100. However, the embodiment of FIG. 8 differs in that the self-leveler 106 is not included in the micro mirror 300. As a result, the micro mirror 300 is sensitive to changes in the operating temperature but not temperature changes caused by scene radiation.

In one embodiment, the radiation absorption surface 12 can be optional. In such an embodiment, the bi-material actuator 104 can be connected to the frame 102 via the light reflecting area 13.

In one embodiment, the micro mirror 300 can correct for signal offsets including translation of a light pattern; change in shape, contrast, or intensity of the light pattern; or any combination thereof. In one embodiment, the signal offset can be the result of a change in temperature of the die on which the micro mirror array is disposed, its surroundings, combinations thereof, or the like. In one embodiment, the signal offset can be caused by a change in ambient temperature, powering a module on from a cold start e.g., as the components heat up, combinations thereof, or the like.

Figure 9:
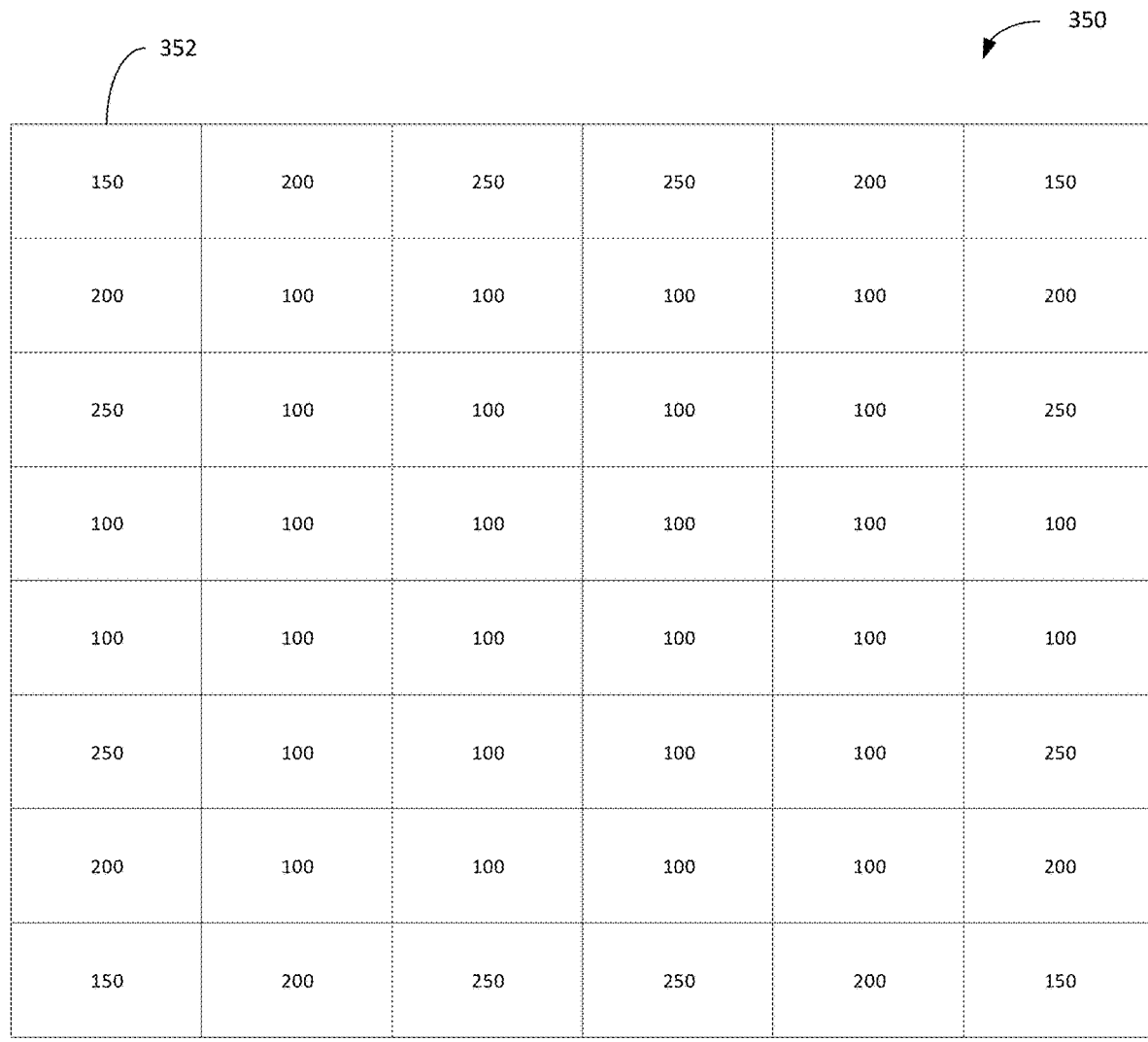
FIG. 9 illustrates an example pattern of a micro mirror array according to one embodiment.

FIG. 9 illustrates an example pattern 350 of a micro mirror array 352 according to one embodiment. In the micro mirror array 352, a plurality of micro mirrors is arranged. In the four corners of the micro mirror array 352, the micro mirror 150, the micro mirror 200, and the micro mirror 250 are included instead of the micro mirror 100. The remaining locations include the micro mirror 100. In one embodiment, the micro mirror 150, the micro mirror 200, and the micro mirror 250 can be placed around the micro mirrors 100. In one embodiment, the micro mirror 150, the micro mirror 200, and the micro mirror 250 can be interspersed within the micro mirrors 100. In one embodiment, a value of the coordinate occupied by the micro mirror 150, the micro mirror 200, and the micro mirror 250 can be estimated based on values of neighboring micro mirrors such as micro mirrors 100. In one embodiment, locations of the micro mirror 150, the micro mirror 200, and the micro mirror 250 can be selected based on expected variations in a given parameter e.g., temperature or the like. If multiple versions of the micro mirror 150, the micro mirror 200, and the micro mirror 250 are included in the micro mirror array 352, increased precision of the offsets can be determined by averaging the output values from each of the micro mirror 150, the micro mirror 200, and the micro mirror 250.

Figure 10:
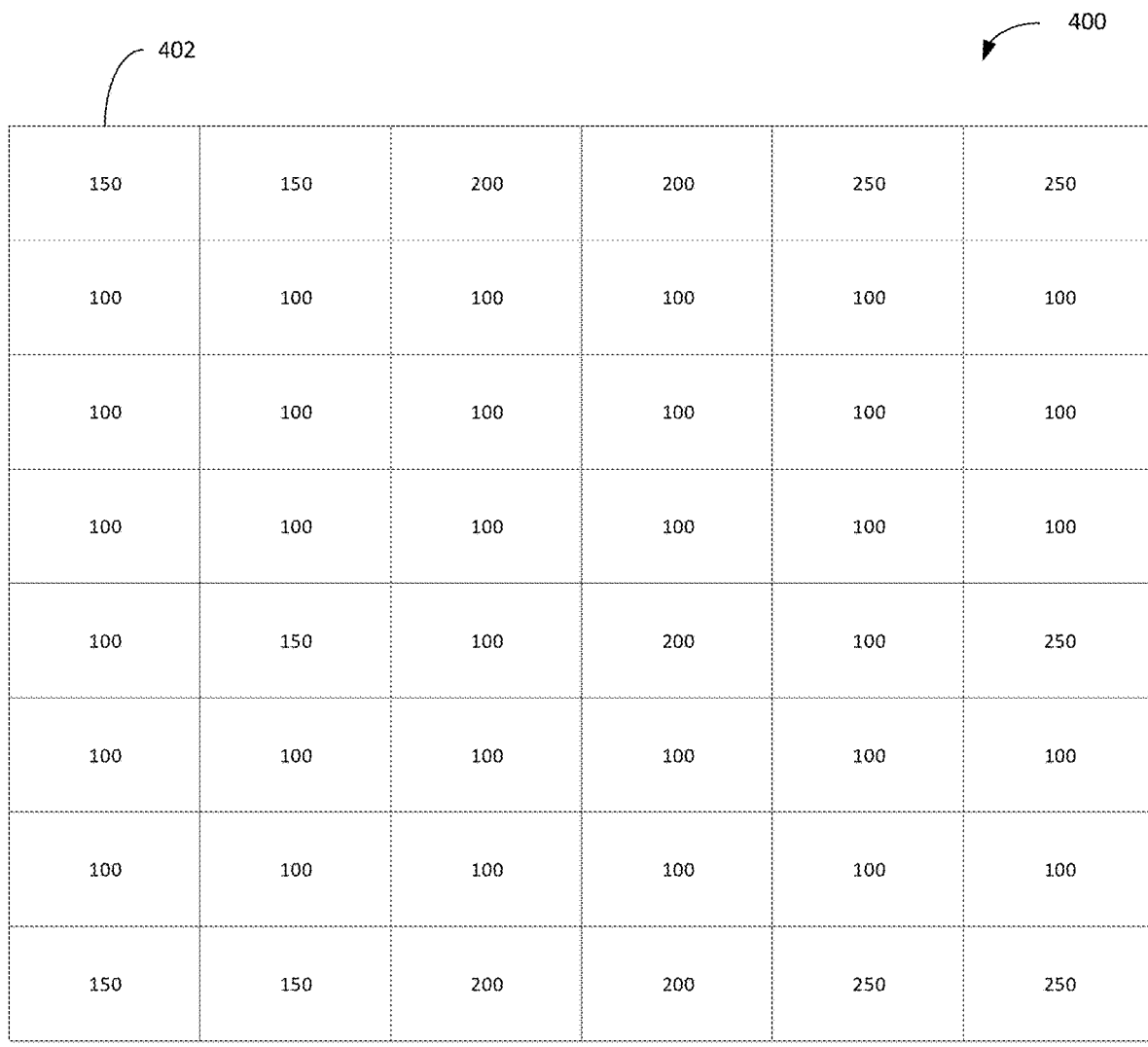
FIG. 10 illustrates an example pattern of a micro mirror array according to one embodiment.

FIG. 10 illustrates an example pattern 400 of a micro mirror array 402 according to one embodiment. The micro mirror array 402 shows a different arrangement of the micro mirrors than the micro mirror array 352 FIG. 9. In the illustrated embodiment, additional inclusions of the micro mirror 150, the micro mirror 200, and the micro mirror 250 are shown. The remaining locations include the micro mirror 100. In one embodiment, the micro mirror 150, the micro mirror 200, and the micro mirror 250 can be placed around the micro mirrors 100. In one embodiment, the micro mirror 150, the micro mirror 200, and the micro mirror 250 can be interspersed within the micro mirrors 100. In one embodiment, a value of the coordinate occupied by the micro mirror 150, the micro mirror 200, and the micro mirror 250 can be estimated based on values of neighboring micro mirrors such as micro mirrors 100. In one embodiment, locations of the micro mirror 150, the micro mirror 200, and the micro mirror 250 can be selected based on expected variations in a given parameter e.g., temperature or the like. If multiple versions of the micro mirror 150, the micro mirror 200, and the micro mirror 250 are included in the micro mirror array 402, increased precision of the offsets can be determined by averaging the output values from each of the micro mirror 150, the micro mirror 200, and the micro mirror 250.

Figure 11:
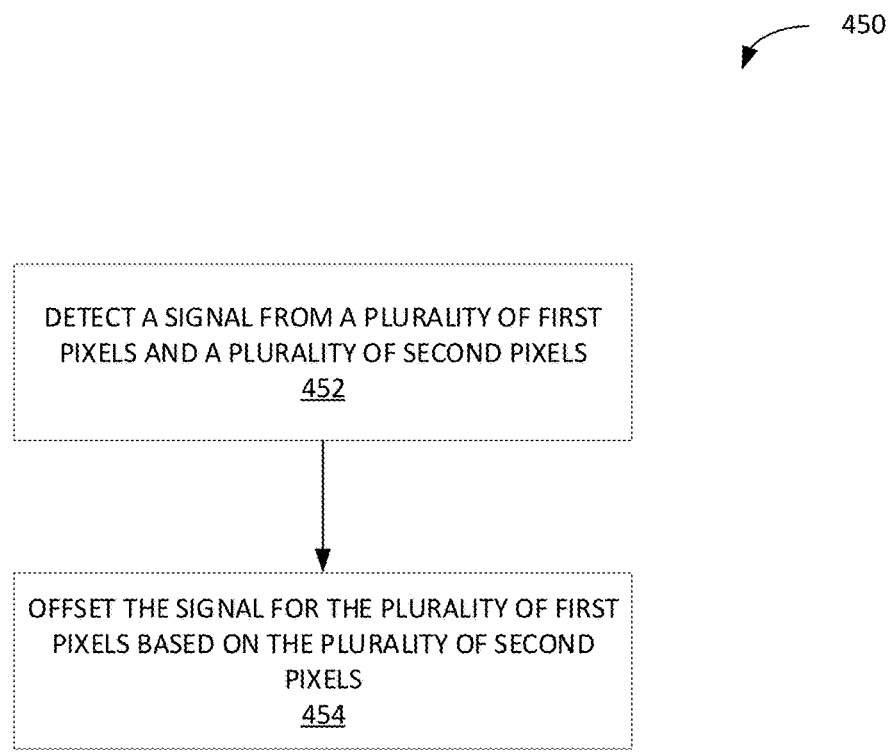
FIG. 11 shows a flowchart of a method according to one embodiment.

FIG. 11 shows a flowchart of a method 450 according to one embodiment. The method 450 can be used to correct a signal detected by a standard pixel based on the signal detected from a reference pixel. In one embodiment, the standard pixel can be the micro mirror 100 shown and described in accordance with FIG. 4 above. In one embodiment, the reference pixels can be one or more of the micro mirror 150 FIG. 5, the micro mirror 200 FIG. 6, the micro mirror 250 FIG. 7, or the micro mirror 300 FIG. 8.

At block 452, the method 450 includes detecting a signal from the reference pixels and the standard pixels in a pixel array e.g., micro mirror array 352 or micro mirror array 402.

At block 454, the method 450 includes correcting an offset on the standard pixels based on the reference pixels. In one embodiment, the readout from the reference pixels is optical and occurs at the same time or substantially the same time as the micro mirrors and the image detecting sensor. In one embodiment, the reference pixels being located in a known relationship to the standard pixels enables calculation of the offsets according to varying conditions. In one embodiment, including a larger number of reference pixels can increase a precision of the measurement by averaging an offset across the various reference pixels. In one embodiment, correcting the offset of the standard pixels can include subtracting a reference pixel value from the standard pixel value. In one embodiment, this correction can be done when the response of the standard pixels is the same as the reference pixels. In one embodiment, if the response of the standard pixels and the reference pixels is different, a coefficient can be used to correct each standard pixel and identify a corresponding correction for each pixel.

Figure 12:
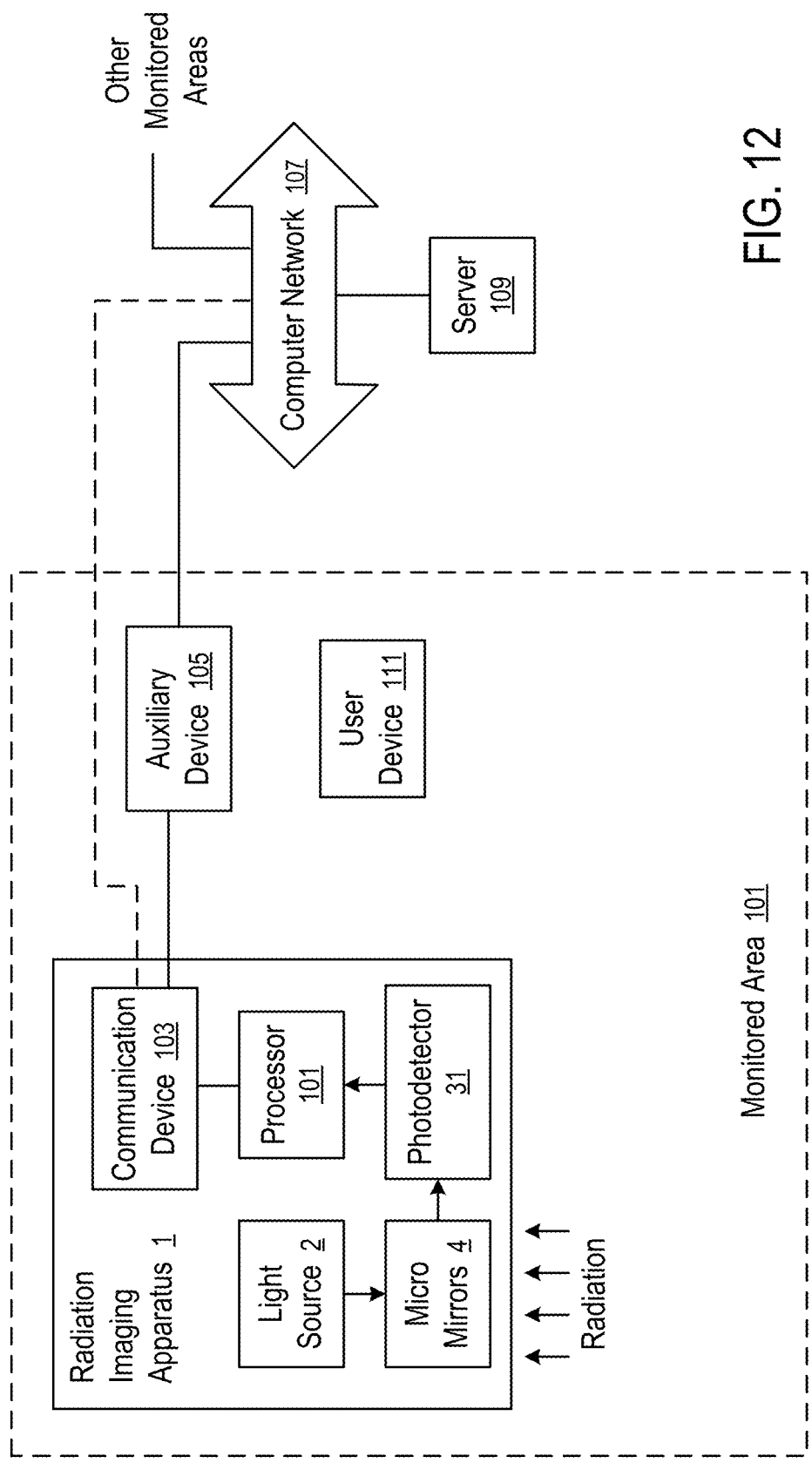
FIG. 12 shows a system to measure radiation according to one embodiment.

FIG. 12 shows a system to measure radiation according to one embodiment.

In FIG. 12, the radiation imaging apparatus 1 includes a light source 2, a set of micro mirrors 4 absorbing radiation and reflecting the light from the light source 2, and a photodetector 31 to capture an image of light spots formed on an imaging surface 5.

For example, the radiation imaging apparatus 1 in FIG. 12 can be implemented in a way illustrated in FIG. 1A or 3A-3C using an array of micro mirrors 4 illustrated in FIG. 1B, 1C, or 4-10 with different light spot characteristics.

In FIG. 12, the radiation imaging apparatus 1 includes: a processor 101 e.g., a microprocessor, or a field-programmable gate array FPGA; and a communication device 103 e.g., a transceiver for wireless local area network, a transceiver for wireless personal area network, a transceiver for a wired communication connection.

Based on a sensitivity requirement or setting, the processor 101 chooses between: 1 processing the image from the photodetector 31 to generate radiation/temperature measurements that are transmitted via the communication device 103; and 2 transmitting, using the communication device 103, the image directly e.g., without processing to allow another device e.g., 105, 109 that is connected to the communication device 103 to process the image at a precision higher than the processing precision of the processor 101.

In some instances, the processor 101 may optionally down sample the image captured by the photodetector 31 e.g., to reduce the data amount to be communicated according to the precision requirement for the current application of the radiation/temperature measurements. In some instances, the processor 101 instructs the photodetector 31 to capture an image of light spots of the micro mirrors 4 at a resolution optimized for the precision requirement of the current application of the radiation/temperature measurements.

In some implementations, the communication device 103 transmits the light spot image, or radiation/temperature measurements, to an optional auxiliary device 105 which may perform additional processing before transmitting the results to a remote server 109 via a computer network 107 e.g., the Internet, an intranet, a local area network. In other implementations, the auxiliary device 105 is not used; and the radiation/temperature measurements and/or the image of the light spots are transmitted to the communication device 103 to the server 109 via the computer network 107 without intermediate processing.

Examples of the auxiliary device 105 include a personal computer, a smart home hub device, a smart phone of a user, a laptop computer, a desktop computer, a digital media play, etc.

Typically, the auxiliary device 105 and/or the server 109 has more computing power than the processor 101 and thus can apply a computationally intensive method in determining the positions of the light spots with improved precision and thus sensitivity.

The server 109 is typically configured in a centralized location e.g., hosted in a cloud computing platform to provide services to many radiation imaging apparatuses e.g., 1 installed at different areas e.g., 101 monitored by the respective radiation imaging apparatuses e.g., 1.

Based on the application of the radiation imaging apparatuses 1 e.g., non-visual environment monitoring and monitoring of human presence for security and safety, energy savings, fire detection, people counting and behavior analysis, the server 109 may transmit notifications or alerts to a user device 111 associated with the radiation imaging apparatuses 1 e.g., via a telecommunication network and/or Internet. The user device 111 may dynamically configured/select a service/application provided via the radiation sensing results.

In general, the user device 111 may or may not be located in the monitored area 101 to receive the notifications or alerts and/or select the application or service.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a radiation imaging apparatus, having:
   an imaging surface;
   a light source; and
   an array of micro mirrors including a plurality of first micro mirrors and a plurality of second micro mirrors,
   wherein the plurality of first micro mirrors rotate according to radiation absorbed in the plurality of first micro mirrors and reflect light from the light source to generate a distribution of reflected light on the imaging surface;
   wherein the plurality of second micro mirrors do not rotate according to radiation absorbed in the plurality of second micro mirrors and reflect light from the light source to generate a distribution of reflected light on the imaging surface;

wherein the plurality of first micro mirrors comprises a first structure and the plurality of second micro mirrors comprise a second structure, the second structure being different than the first structure, wherein the second structure is configured to correct for one or more environmental influences on the radiation imaging apparatus.

2. The system of claim 1, wherein the plurality of second micro mirrors comprises the second structure, a third structure, a fourth structure, a fifth structure, or any combination thereof.

3. The system of claim 2, wherein the second structure comprises a light reflecting area and a member rigidly attaching at least one of the plurality of second micro mirrors to a frame.

4. The system of claim 2, wherein the third structure comprises a light reflecting area, a member, and a self-leveler.

5. The system of claim 2, wherein the fourth structure comprises a light reflecting area, a bi-material actuator, a self-leveler, and a radiation blocking layer.

6. The system of claim 2, wherein the fifth structure comprises a light reflecting area, and a bi-material actuator.

7. The system of claim 1, wherein more of the plurality of first micro mirrors are present in the array of micro mirrors than the plurality of second micro mirrors.

8. The system of claim 1, wherein the plurality of first micro mirrors each comprise a radiation absorption surface, a light reflecting area, a bi-material actuator, and a self-leveler.

9. The system of claim 1, wherein at least one of the plurality of second micro mirrors comprises a radiation absorption surface.

10. The system of claim 1, wherein the plurality of second micro mirrors includes at least three of the plurality of second micro mirrors.

11. The system of claim 1, wherein the plurality of second micro mirrors is arranged in one or more corners of the micro mirror array.

12. The system of claim 1, comprising:
a photodetector, wherein the photodetector captures an image of the distribution of reflected light on the imaging surface;
a processor coupled to the photodetector; and
a communication interface coupled with the processor; and
a computing device located separately from the radiation imaging apparatus and
in communication with the communication interface;
wherein the computing device is one of:
a server hosted on a cloud computing platform and connected to the communication interface via a computer network;
an auxiliary device connected to the communication interface; and
an auxiliary device connected to the communication interface via a computer network.

13. A radiation imaging apparatus, comprising:
an imaging surface;
a light source;
an array of micro mirrors including a plurality of first micro mirrors and a plurality of second micro mirrors, wherein the plurality of first micro mirrors rotate according to radiation absorbed in the plurality of first micro mirrors and reflect light from the light source to generate a distribution of reflected light on the imaging surface;
wherein the plurality of second micro mirrors do not rotate according to radiation absorbed in the plurality of second micro mirrors and reflect light from the light source to generate a distribution of reflected light on the imaging surface;
wherein the plurality of first micro mirrors comprises a first structure and the plurality of second micro mirrors comprise a second structure, the second structure being different than the first structure, wherein the second structure is configured to correct for one or more environmental influences on the radiation imaging apparatus;
a photodetector, wherein the photodetector captures an image of the distribution of reflected light on the imaging surface;
a processor coupled to the photodetector; and
a communication interface coupled with the processor; and
a computing device located separately from the radiation imaging apparatus and in communication with the communication interface.

14. The radiation imaging apparatus of claim 13, wherein more of the plurality of first micro mirrors are present in the array of micro mirrors than the plurality of second micro mirrors.

15. The radiation imaging apparatus of claim 13, wherein the plurality of first micro mirrors each comprise a radiation absorption surface, a light reflecting area, a bi-material actuator, and a self-leveler.

16. The radiation imaging apparatus of claim 13, wherein at least one of the plurality of second micro mirrors comprises a light reflecting area, and a member rigidly attaching the at least one of the plurality of second micro mirrors to a frame.

17. The radiation imaging apparatus of claim 13, wherein at least one of the plurality of second micro mirrors comprises a light reflecting area, a member, and a self-leveler.

18. The radiation imaging apparatus of claim 13, wherein at least one of the plurality of second micro mirrors comprises a light reflecting area, a bi-material actuator, a self-leveler, and a radiation blocking layer.

19. The radiation imaging apparatus of claim 13, wherein at least one of the plurality of second micro mirrors comprises a light reflecting area, and a bi-material actuator.

20. A method, comprising:
rotating a plurality of first micro mirrors of a radiation imaging apparatus according to radiation absorbed in the micro mirrors;
rotating a plurality of second micro mirrors of a radiation imaging apparatus according to one or more environmental influences on the radiation imaging apparatus independently of radiation absorbed in the micro mirrors;
directing light from a light source of the radiation imaging apparatus on the micro mirrors which reflect the light to generate light spots on an imaging surface;
capturing, by a photodetector, an image of the light spots reflected on the imaging surface by the micro mirrors;
offsetting the rotation of the plurality of first micro mirrors based on the rotation of the plurality of second micro mirrors; and transmitting the rotation of the plurality of first micro mirrors as offset.

* * * * *